United States Patent
Liu et al.

(10) Patent No.: US 9,947,111 B2
(45) Date of Patent: Apr. 17, 2018

(54) METHOD OF MULTIPLE CAMERA POSITIONING UTILIZING CAMERA ORDERING

(71) Applicant: SONY CORPORATION, Tokyo (JP)

(72) Inventors: Cheng-Yi Liu, San Jose, CA (US); Alexander Berestov, San Jose, CA (US)

(73) Assignee: Sony Corporation, Tokyo (JP)

(*) Notice: Subject to any disclaimer, the term of this patent is extended or adjusted under 35 U.S.C. 154(b) by 44 days.

(21) Appl. No.: 14/925,465

(22) Filed: Oct. 28, 2015

(65) Prior Publication Data

US 2017/0124712 A1 May 4, 2017

(51) Int. Cl.
| | |
|---|---|
| G06K 9/46 | (2006.01) |
| G06K 9/20 | (2006.01) |
| G06T 7/73 | (2017.01) |
| G06T 7/33 | (2017.01) |
| G06T 7/80 | (2017.01) |
| H04N 17/00 | (2006.01) |
| G06T 7/00 | (2017.01) |

(52) U.S. Cl.
CPC ............... *G06T 7/73* (2017.01); *G06K 9/209* (2013.01); *G06K 9/4671* (2013.01); *G06T 7/33* (2017.01); *G06T 7/80* (2017.01); *G06T 7/97* (2017.01); *H04N 17/002* (2013.01); *G06T 2207/10016* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 6,975,755 B1* | 12/2005 | Baumberg | G06K 9/4642 345/419 |
| 8,760,521 B2 | 6/2014 | Medeiros et al. | |
| 8,786,680 B2 | 7/2014 | Shiratori et al. | |
| 2010/0231723 A1* | 9/2010 | Nam | G06K 9/00771 348/169 |
| 2011/0310255 A1* | 12/2011 | Medeiros | G06T 7/292 348/187 |
| 2013/0155058 A1* | 6/2013 | Golparvar-Fard | G06T 19/006 345/419 |
| 2013/0278727 A1 | 10/2013 | Tamir et al. | |
| 2014/0253732 A1* | 9/2014 | Brown | G06T 7/80 348/159 |
| 2015/0036888 A1 | 2/2015 | Weisenburger | |
| 2015/0049955 A1* | 2/2015 | Stoeffler | G06K 9/6202 382/220 |

(Continued)

OTHER PUBLICATIONS

Oda, Kazuo. "Quasi-five point algorithm with non-linear minimization." The International Archives of Photogrammetry, Remote Sensing and Spatial Information Sciences 40.5 (2014): 473.*

(Continued)

*Primary Examiner* — Kim Vu
*Assistant Examiner* — Nathan Bloom
(74) *Attorney, Agent, or Firm* — Haverstock & Owens LLP

(57) ABSTRACT

A method to position multiple camera using camera ordering is described herein. Based on two known camera positions, a third camera position is able to be determined using acquired information and calculations.

24 Claims, 27 Drawing Sheets

(56) References Cited

U.S. PATENT DOCUMENTS

2016/0223318 A1* 8/2016 Liu .................... G06T 7/11

OTHER PUBLICATIONS

Matsuyama, Takashi, et al. Multi Camera Systems for 3D Video Production. Springer Science & Business Media, 2012.*
Hartley, Richard I. "In defense of the eight-point algorithm." IEEE Transactions on pattern analysis and machine intelligence 19.6 (1997): 580-593.*

* cited by examiner

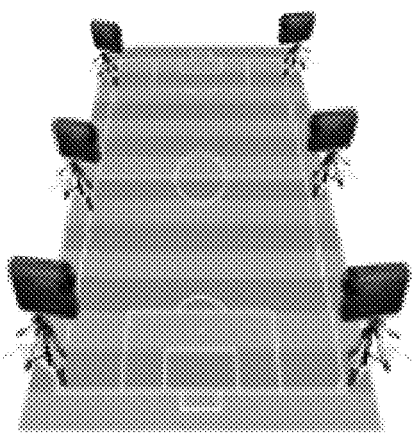
Fig. 1

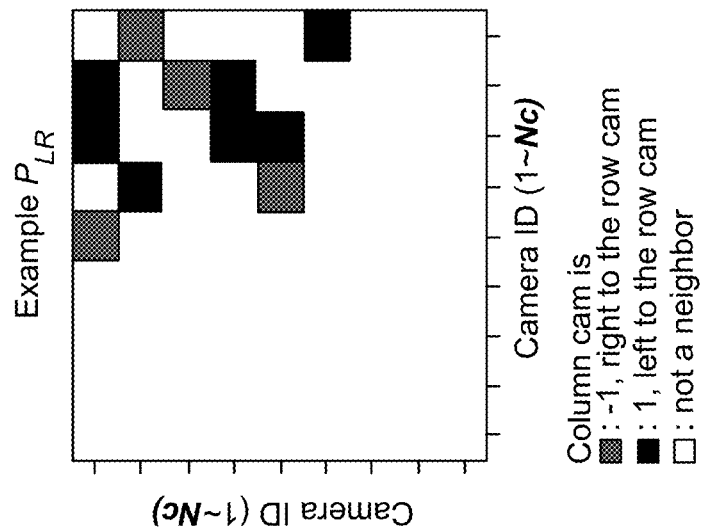
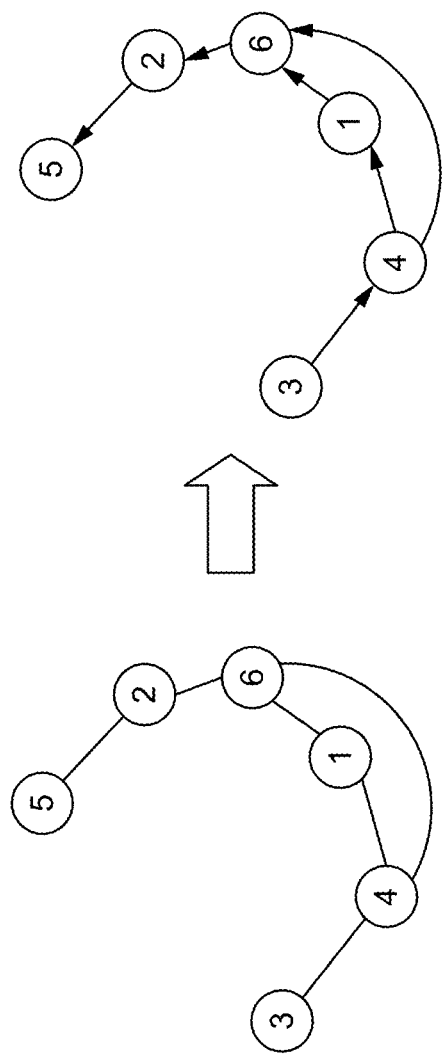
Fig. 16

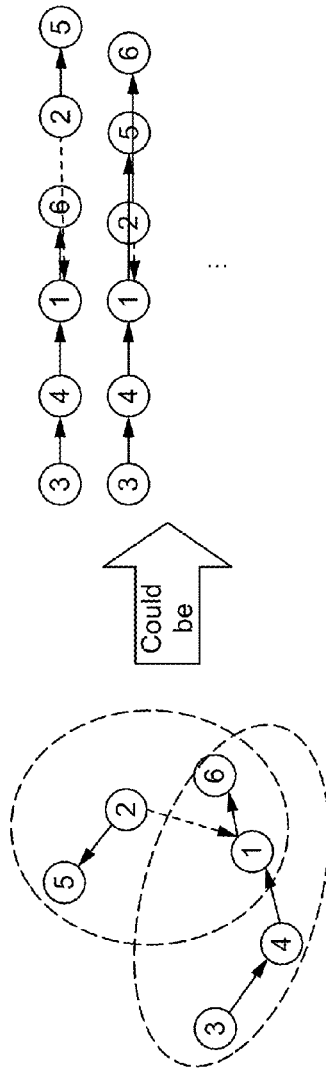
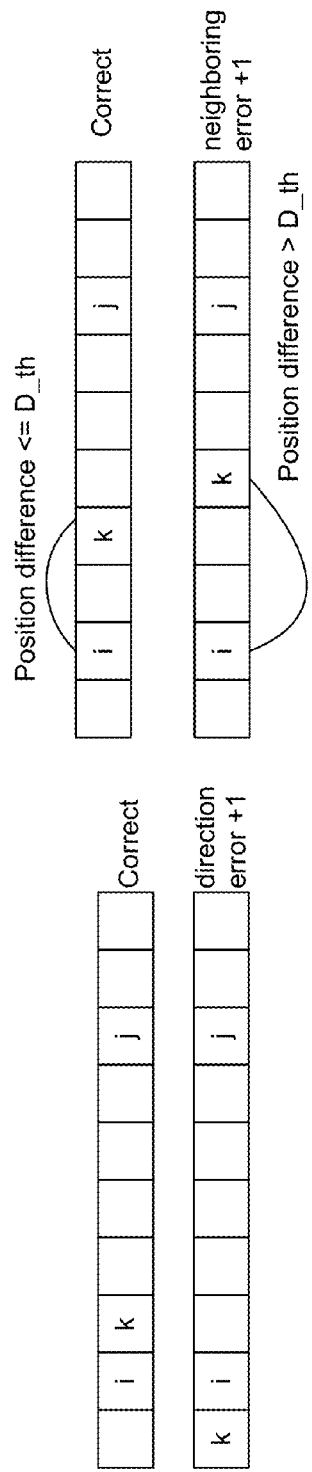
Fig. 21
Fig. 22
Fig. 23

For the Initial Camera Pair Selection
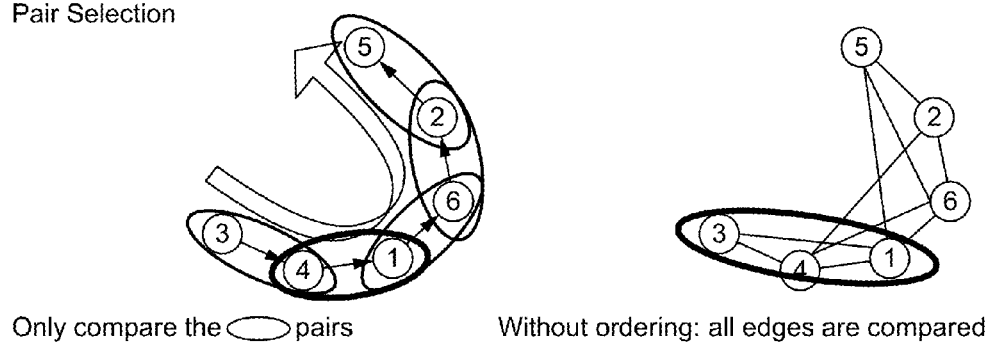
Only compare the ⬭ pairs          Without ordering: all edges are compared
For the Next Camera Selection
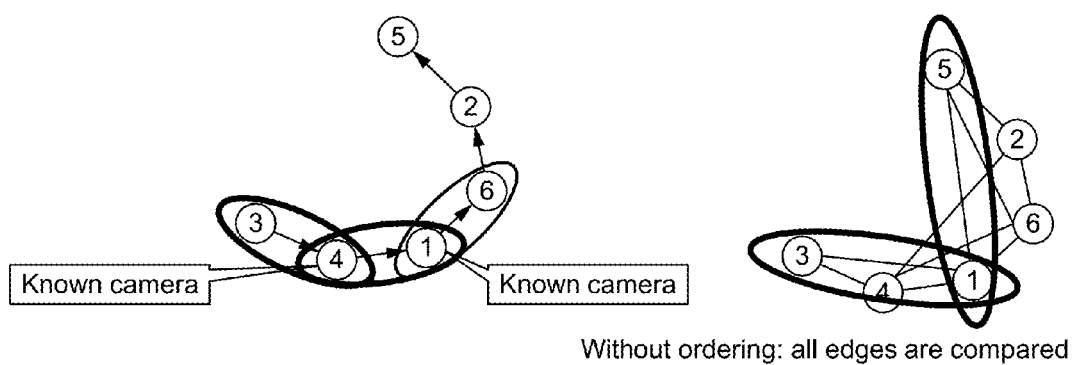
Without ordering: all edges are compared
Fig. 31

METHOD OF MULTIPLE CAMERA POSITIONING UTILIZING CAMERA ORDERING

FIELD OF THE INVENTION

The present invention relates to cameras. More specifically, the present invention relates to camera positioning.

BACKGROUND OF THE INVENTION

Camera location ordering has been addressed under the assumption that the orientation differences between cameras are small (e.g., <15 degrees) by estimating the intrinsic and extrinsic parameters of all cameras and the found 3D keypoints. This type of method is usually called "structure from motion" (SfM) which requires intensive computation of non-linear equations and optimizations. For larger orientation differences, the mainstream method is to track and identify the common moving objects over a period of time so the relative positions between each neighboring cameras are able to be inferred.

To deal with the problem of estimating multiple camera positions, the previous implementation is "Structure from Motion" (SfM) based on "Perspective n Point" (PnP) which requires at least three 3D points seen by three consecutive cameras; however, such points are harder to find if the difference of viewing angles between neighboring cameras is bigger than 15 degrees.

SUMMARY OF THE INVENTION

A method to position multiple camera using camera ordering is described herein. Based on two known camera positions, a third camera position is able to be determined using acquired information and calculations.

In one aspect, a method programmed in a non-transitory memory of a device comprises obtaining camera ordering of a plurality of cameras, selecting and positioning an initial camera pair of the plurality of cameras and estimating a camera position of a camera not in the initial camera pair of the plurality of cameras using the camera ordering of the plurality of cameras. The method further comprises assuming the plurality of cameras are positioned toward an object so positions of the plurality of cameras form a circle or a convex arc. A position of the initial camera pair is known. Estimating the camera position of the camera not in the initial camera pair utilizes five local correspondences between each of three camera pairs. Estimating the camera position of the camera not in the initial camera pair is based on a 5-point essential matrix estimation. Estimating the camera position of the camera not in the initial camera pair is based on a matrix and an 8-point algorithm. Estimating the camera position of the camera not in the initial camera pair includes bundle adjust after each estimate of the camera position. Obtaining camera ordering comprises: performing background extraction, performing pairwise camera correspondence extraction, identifying neighboring cameras, determining neighboring camera positioning and performing camera list topology deduction.

In another aspect, a system comprises a plurality of camera devices each configured for capturing video content and a computing device configured for: obtaining camera ordering of the plurality of cameras, selecting and positioning an initial camera pair of the plurality of cameras and estimating a camera position of a camera not in the initial camera pair of the plurality of cameras using the camera ordering of the plurality of cameras. The computing device is further configured for assuming the plurality of cameras are positioned toward an object so positions of the plurality of cameras form a circle or a convex arc. A position of the initial camera pair is known. Estimating the camera position of the camera not in the initial camera pair utilizes five local correspondences between each of three camera pairs. Estimating the camera position of the camera not in the initial camera pair is based on a 5-point essential matrix estimation. Estimating the camera position of the camera not in the initial camera pair is based on a matrix and an 8-point algorithm. Estimating the camera position of the camera not in the initial camera pair includes bundle adjust after each estimate of the camera position. Obtaining camera ordering comprises: performing background extraction, performing pairwise camera correspondence extraction, identifying neighboring cameras, determining neighboring camera positioning and performing camera list topology deduction.

In another aspect, an apparatus comprises a non-transitory memory for storing an application, the application for: obtaining camera ordering of a plurality of cameras, selecting and positioning an initial camera pair of the plurality of cameras and estimating a camera position of a camera not in the initial camera pair of the plurality of cameras using the camera ordering of the plurality of cameras and a processing component coupled to the memory, the processing component configured for processing the application. The application is further for assuming the plurality of cameras are positioned toward an object so positions of the plurality of cameras form a circle or a convex arc. A position of the initial camera pair is known. Estimating the camera position of the camera not in the initial camera pair utilizes five local correspondences between each of three camera pairs. Estimating the camera position of the camera not in the initial camera pair is based on a 5-point essential matrix estimation. Estimating the camera position of the camera not in the initial camera pair is based on a matrix and an 8-point algorithm. Estimating the camera position of the camera not in the initial camera pair includes bundle adjust after each estimate of the camera position. Obtaining camera ordering comprises: performing background extraction, performing pairwise camera correspondence extraction, identifying neighboring cameras, determining neighboring camera positioning and performing camera list topology deduction.

BRIEF DESCRIPTION OF THE DRAWINGS

FIG. 1 illustrates exemplary configurations of multiple camera configurations according to some embodiments.

FIG. 16 illustrates a diagram of an undirected graph to a directed graph according to some embodiments.

FIG. 21 illustrates a diagram of neighbor refinement according to some embodiments.

FIG. 22 illustrates a diagram of neighbor refinement according to some embodiments.

FIG. 23 illustrates a diagram indicating missing data according to some embodiments.

FIG. 31 illustrates diagrams of using camera ordering according to some embodiments.

DETAILED DESCRIPTION OF THE PREFERRED EMBODIMENT

Figure 2:
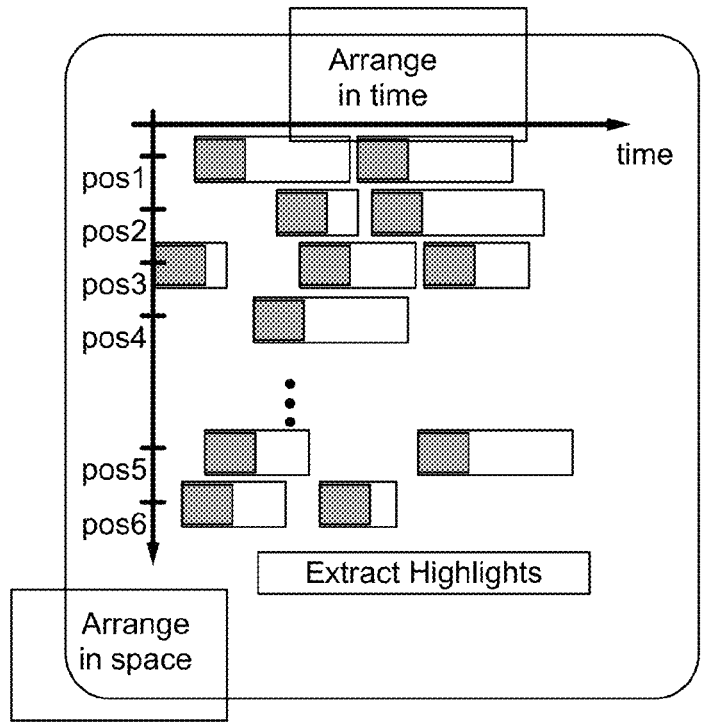
FIG. 2 illustrates an exemplary diagram of arranging the video content from the multiple video cameras in time and space according to some embodiments.

A method to estimate a set of camera locations, in clockwise or counter-clockwise order, according to the videos captured by these cameras is described herein. In some embodiments, the cameras are assumed to be fixed, with no or very mild tilting angles and no rolling angles (the horizon is horizontal in each camera image). In some embodiments, the difference of orientation (rolling angle) between each neighboring (closest) camera pair is able to be up to 45 degrees. Each camera is assumed to have overlapped views with at least one other camera. Each camera has one right neighboring camera and one left neighboring camera, except the first and the last cameras which have only one neighboring camera at one side. The locations of the cameras then are able to be expressed as a unique list counter-clockwise. The input videos are assumed to be synchronized in time.

Only using the corresponding points or patches between all combinations of the camera pairs, the method performs: (1) neighboring camera identification to narrow down the following computation, (2) neighboring camera positioning to mark the left/right relation between each neighboring camera pairs, and (3) global camera list topology deduction according to the local pairwise directions, which includes error detection and recovery to tolerate few erroneous camera pair relations. The method is fast because it does not contain complicated camera parameter estimation. It is also robust due to the error detection/recovery mechanism of the method.

Instead of a complicated estimation of the entire 3D points and the camera parameters, a simpler method and features which are sufficient to identify the ordering of cameras at large orientation differences is described. Although moving objects are able to be helpful to this problem, the method is able to handle the condition without moving objects in the scene.

Assuming there are N cameras, the camera location ordering method includes:
1. Fast neighboring camera identification performs the complete comparison $O(N^2)$ in this component and benefits with computational efficiency.
2. Fast neighboring camera positioning (Left/Right) by the difference of motion flows between the moving objects and the background. The method is very simple, fast, and again there is no explicit parameter estimation.
3. Global camera list topology deduction by a few number of neighboring camera relations with error detection and recovery. The method is a swapping-based sequencing constrained by the neighboring camera information. It includes resolving the loop conditions which could not be handled by the original swapping algorithm. The method also detects and recovers the missing camera pairs so the final solution is globally optimal.

Additionally, there is no estimate of the camera and 3D point parameters as performed by the conventional methods; rather, statistical information is utilized.

Fast neighboring camera identification by the goodness of correspondence has a cross-validation step, and global camera list topology deduction is able to detect errors, recover errors, and compute the missing data. Both are robust to erroneous input.

Fast neighboring camera positioning is able to compute the left/right relation solely based on the background information as long as the neighboring cameras are not facing outward (very few overlaps).

The methods described herein are able to be applied to (1) interactive camera selection to view the same event from different viewing angles, (2) automatic camera network organization in video surveillance, (3) automatic organization of video stocks according to their captured locations, and (4) as a preprocessing stage before SfM to achieve a faster camera network positioning, which is able to be use in 3D sports video, view interpolation and point clouds generation.

Background/Moving object extraction by a GMM-based background modeling over a short video duration (20 seconds) is able to be utilized. Other methods which extract the pixels of moving objects are also able to be used.

Fast camera pair correspondence using the existing keypoint methods such as SIFT, SURF, BRISK, or FREAK are able to be utilized. SIFT and SURF generate a grid around a keypoint and divide each grid cell into sub-grids. At each sub-grid cell, the gradient is calculated and is binned by angle into a histogram whose counts are increased by the magnitude of the gradient, all weighted by a Gaussian. BRISK is a 512 bit binary descriptor that computes the weighted Gaussian average over a select pattern of points near the keypoint. Values of specific pairs of Gaussian windows are compared, depending on which window in the pair was greater. FREAK evaluates 43 weighted Gaussians at locations around the keypoint, but the pattern formed by the Gaussians is biologically inspired by the retinal pattern in the eye. As to keypoint detection, methods to obtain evenly distributed keypoints, such as the Grid-based keypoint sampling, are favored. Other methods providing the corresponding points/patches are also capable. If the corresponding patches with segmentation information are available, a better matching between a camera pair is able to be used. Still other methods computing the similarity between two images are able to be used to decide if two cameras are able to be considered as neighboring candidates or not.

Neighboring camera candidate cross-validation is able to be done with the k-NN relations. More complicated implementations may include bi-directional camera pair information to compute the probability of neighboring cameras.

The camera location ordering method arranges videos captured by multiple cameras by time and/or space. FIG. 1 illustrates exemplary configurations of multiple camera configurations according to some embodiments. FIG. 2 illustrates an exemplary diagram of arranging the video content from the multiple video cameras in time and space according to some embodiments.

The time-synchronized videos captured by multiple cameras are the input, and ordering of the whole cameras clockwise or counter-clockwise is the output.

Figure 3:
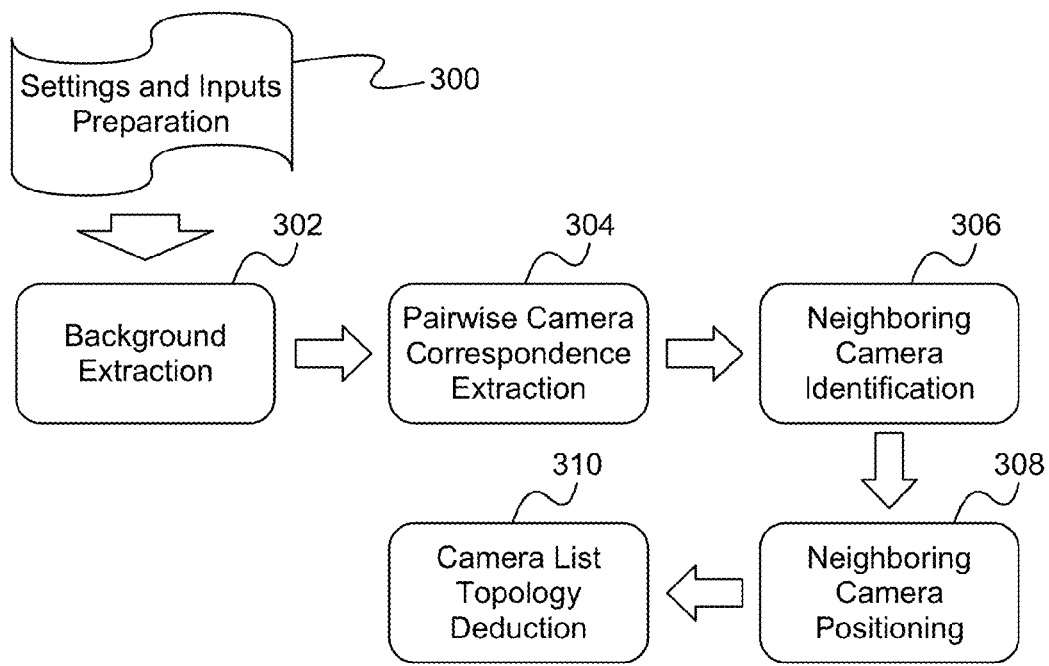
FIG. 3 illustrates a diagram of a process flow according to some embodiments.

FIG. 3 illustrates a diagram of a process flow according to some embodiments. In the step 300, settings and input are prepared. In the step 302, background extraction is performed. In the step 304, pairwise camera correspondence extraction is performed. In the step 306, neighboring cameras are identified. In the step 308, neighboring camera positioning is determined. In the step 310, camera list topology deduction is performed. In some embodiments, fewer or additional steps are implemented. In some embodiments, the order of the steps is modified. The steps are described in further detail herein. The following is a list of notations used herein:

$N_c$: Number of cameras
$C_i$: Camera i
$N_f$: Sequence duration (in frames)
$R_i$: Moving object region (rectangles) in the image of Camera i
$\sim R_i$: Background in the image of Camera i
$K_i$: Set of keypoints of camera i
$k_{i,k}$: The j'th keypoint of camera i. A keypoint is a 4×1 vector of (x=x_coordinate, y=y_coordinate, s=scale, o=orientation).
$M_{ij}$: Set of the corresponding keypoints (correspondences) between camera i and camera j
$k_{i,m}$: Keypoint in image i of correspondence m
x: Count of discrete variable x
$M_{ij}$: Number of the corresponding keypoints between camera i and camera j
P: $N_c \times N_c$ binary neighboring camera map
$P_{LR}$: $N_c \times N_c$ neighboring camera relative direction map
T: Camera list topology (counter-clockwise)

In preprocessing, the input images of each camera are read. The background extraction step (302) uses the original RGB 24-bit images, and the pairwise camera correspondence extraction step (304) uses the grayscale (8-bit 0~255) images converted from the original RGB images.

Figure 4:
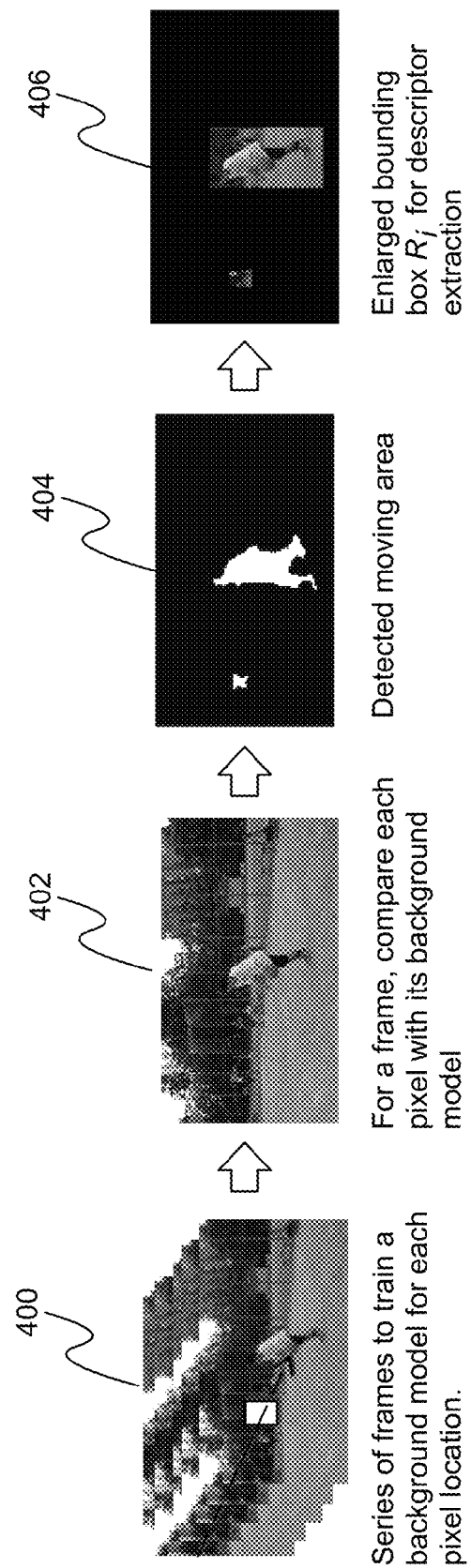
FIG. 4 illustrates images describing background extraction according to some embodiments.

The background extraction step (302) includes substeps: background modeling and reliable moving objects. The background extraction step is utilized to extract the background/moving object regions for each camera which are able to be used for applying different parameters or algorithms. FIG. 4 illustrates images describing background extraction according to some embodiments. In 400, a series of frames are used to train a background model for each pixel location. In 402, for a frame, each pixel is compared with its background model. In 404, a moving area is detected. In 406, an enlarged bounding box $R_i$ for descriptor extraction is shown.

Background modeling is utilized to build a background intensity model for each pixel so most moving objects with color difference to the background are able to be detected. The background modeling method includes generating a Gaussian Mixture Model (GMM) for each pixel. M Gaussians for each pixel are totaled. Assuming each data was drawn from a single Gaussian (exactly one of the $y_m$ from $\bar{y}$ is able to be equal to 1 and the others are zero).

$$p(\vec{x}, \vec{y}; \vec{\theta}) = $$

$$p(\vec{y}; \pi_1, \dots, \pi_M) p(\vec{x} \mid \vec{y}; \vec{\theta}_1, \dots, \vec{\theta}_M) = \prod_{m=1}^{M} \pi_m^{y_m} p_m(\vec{x}; \vec{\theta}_m)^{y_m},$$

where p is the overall posterior probability, $\vec{\chi}$ is data, $\vec{y}$ is the indicator of Gaussian the data is drawn from, $\pi$ is the weight of Gaussian m, $\vec{\theta}_m$ are Gaussian parameters, and $y_m$ is binary indicating whether drawn from this component or not.

An iterative algorithm for the GMM model is utilized. For initialization, there is an unknown number of Gaussian components (M), so M is made large. There are unknown parameters for each Gaussian $\vec{\theta}_m, \pi_m$, so a random guess is able to be used. The iterative algorithm simultaneously updates M and the parameters and penalizes complicated models (so to reduce M).

For background modeling, RGB images of time=1 ... $N_f$ are input. The GMM models are computed for all pixel locations. Any pixel i has its color model parameters, $\theta_i = \{\mu_{i,1}, \sigma_{i,1}, \mu_{i,2}, \sigma_{i,2}, \dots \mu_{i,M}, \sigma_{i,M}\}$. For a frame to detect at time t, pixel i is a marker as foreground if p(I(i,t), <Threshold (Equation 1), where $p(i, \theta_i)$ is the probability of I(i,t), the intensity of pixel i at time t, belonging to the background. In the GMM model, Equation 1 is able to be performed by checking the squared Mahalanobis distance:

foreground if for all m=1 ... M, (I(i,t)–$\mu_{i,m})^2 > Th\_var * \sigma_{i,m}^2$.

The output is h(1) ... h($N_f$), background/foreground masks for time=1 ... $N_f$. In some embodiments, t>1 is chosen after the background extraction process as the initial t=1 frame or background may not be stable yet.

The substep of reliable moving objects removes the false positive moving object regions due to abrupt camera shakes or noise. The reliable moving object substep uses durations and the motion co-occurrence in time of the moving object regions to identify the locally specific motions, based on the assumption that the true motion will be around the center of the image, there is an uneven distribution of the motion pixels.

Figure 5:
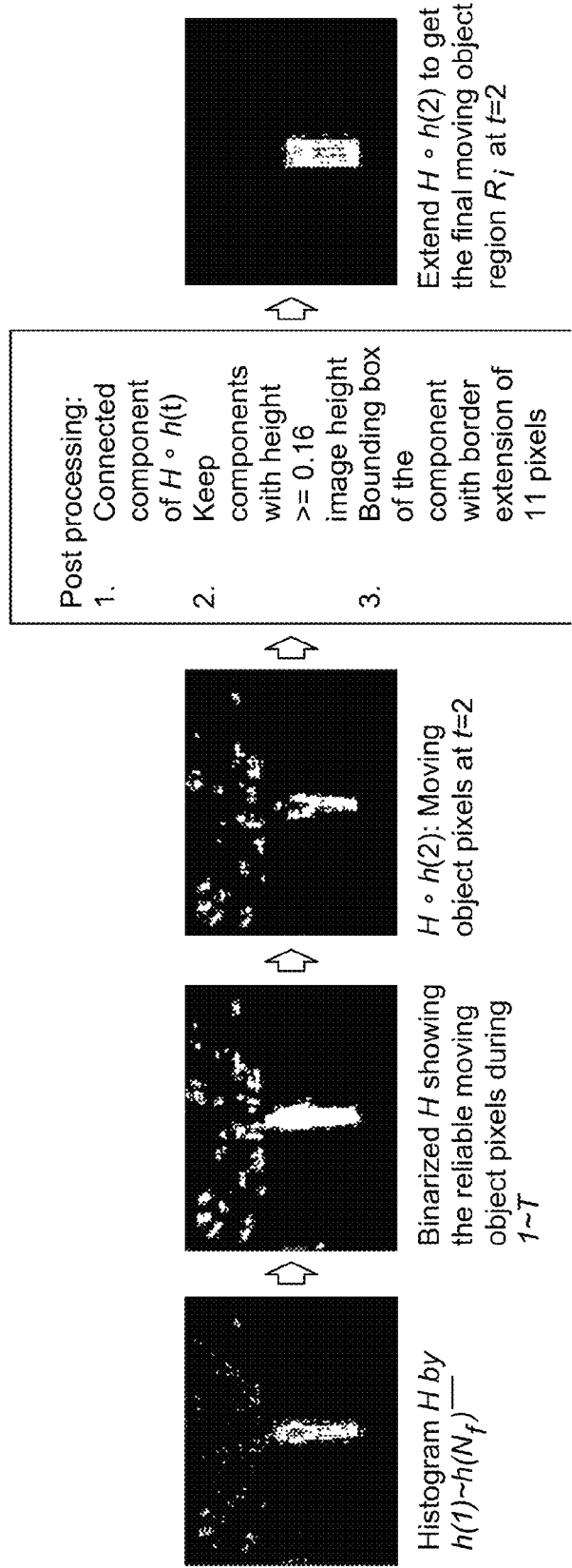
FIG. 5 illustrates a diagram of the reliable moving objects substep according to some embodiments.

FIG. 5 illustrates a diagram of the reliable moving objects substep according to some embodiments.

The input of the reliable moving objects substep receives h(1) . . . h(N_f) from the background modeling substep. An image histogram of moving object probability over time is generated. A smaller weight at time t is used if massive motion areas are detected:

$$H = \sum_{t=1}^{N_t} w(t) * h(t)$$
$$= \frac{1}{motionarea(t=1)} * h(t=1) + \frac{1}{motionarea(t=2)} * h(t=2) + \ldots$$

H is binarized by thresholding. The output, where t is the time of frame to analyze, is $R'_i = H \circ h(t)$ where '∘' is the element-wise product operator. Post-processing is applied to $R'_i$ to get the final $R_i$.

The pairwise camera correspondence extraction step (304) includes several substeps: keypoint detection with subsampling, keypoint descriptor extraction and pairwise correspondence. The pairwise camera correspondence extraction is for extracting the corresponding points between a pair of images captured by two cameras where the corresponding points are representing the same real 3D position. The spatial distribution of corresponding points should be as even as possible.

Figure 6:
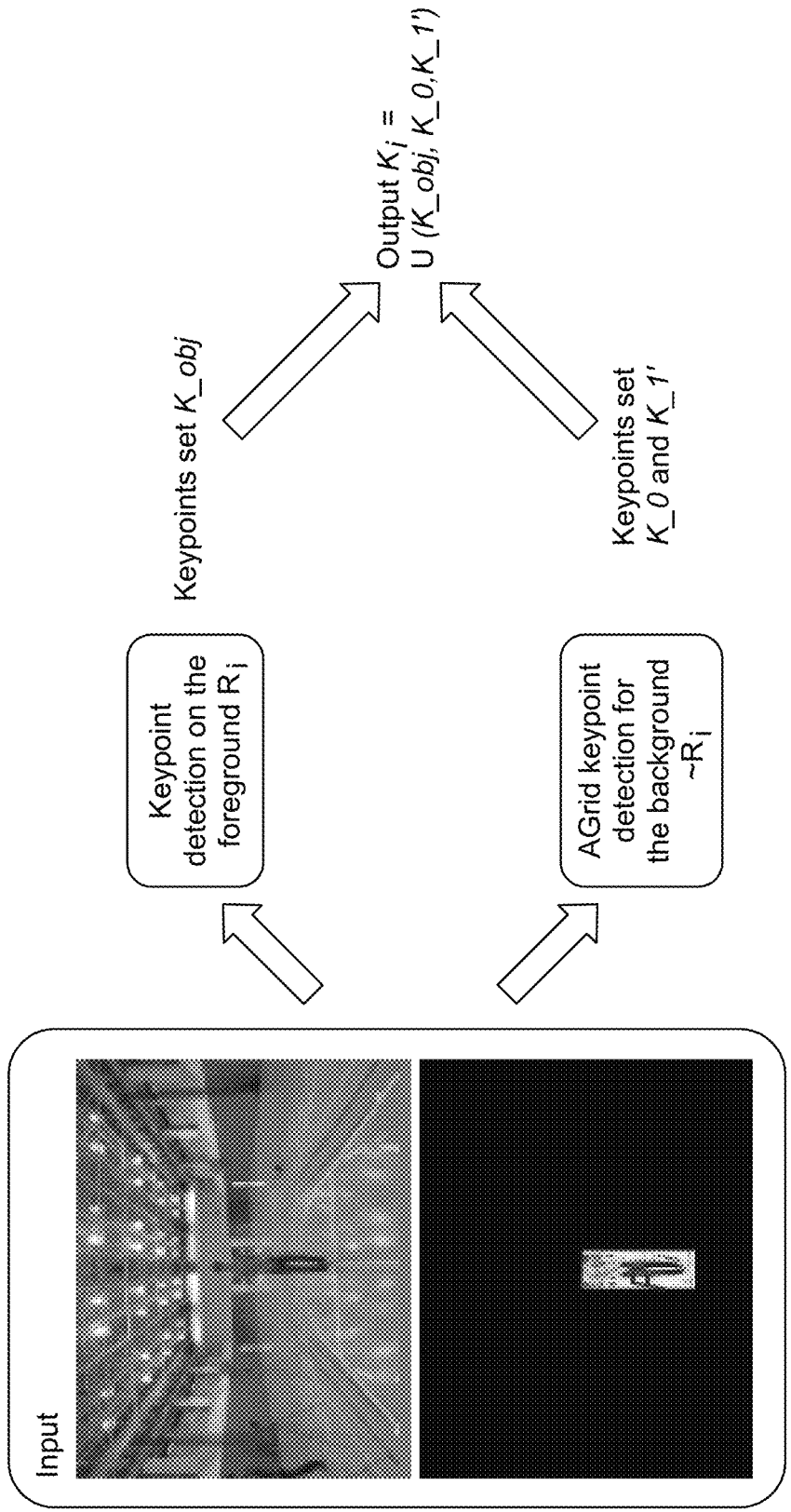
FIG. 6 illustrates a diagram of a process flow of keypoint detection according to some embodiments.

FIG. 6 illustrates a diagram of a process flow of keypoint detection according to some embodiments. Keypoint detection receives an input, performs keypoint detection on the foreground and adaptive grid keypoint detection for the background, the foreground produces a keypoints set K_obj and the background produces a keypoints set K_0 and K_1', and the output is $K_i = \cup(K\_obj, K\_0, K\_1')$. A keypoint is a 4×1 vector of (x=x_coordinate, y=y_coordinate, s=scale, o=orientation).

Keypoint detection constrains the representative samples for correspondence matching. SIFT keypoint detection function by OpenCV is able to be used. A whole image or an image patch is input, and the output is a set of keypoints inside the input image. For example, the implementation includes scale-space extrema detection by DoG, keypoint localization, unstable points like those with low contrast or high edge responses are eliminated, and orientation is assigned.

Keypoint subsampling is utilized since the background is usually much more spread out than moving objects, and keypoint distribution to cover ~$R_i$ as complete as possible is preferred. Instead of purely adding points everywhere, the detected keypoints in the homogeneous area are representative for accurate matching using adaptive grid (AGrid) for subsampling.

Figure 7:
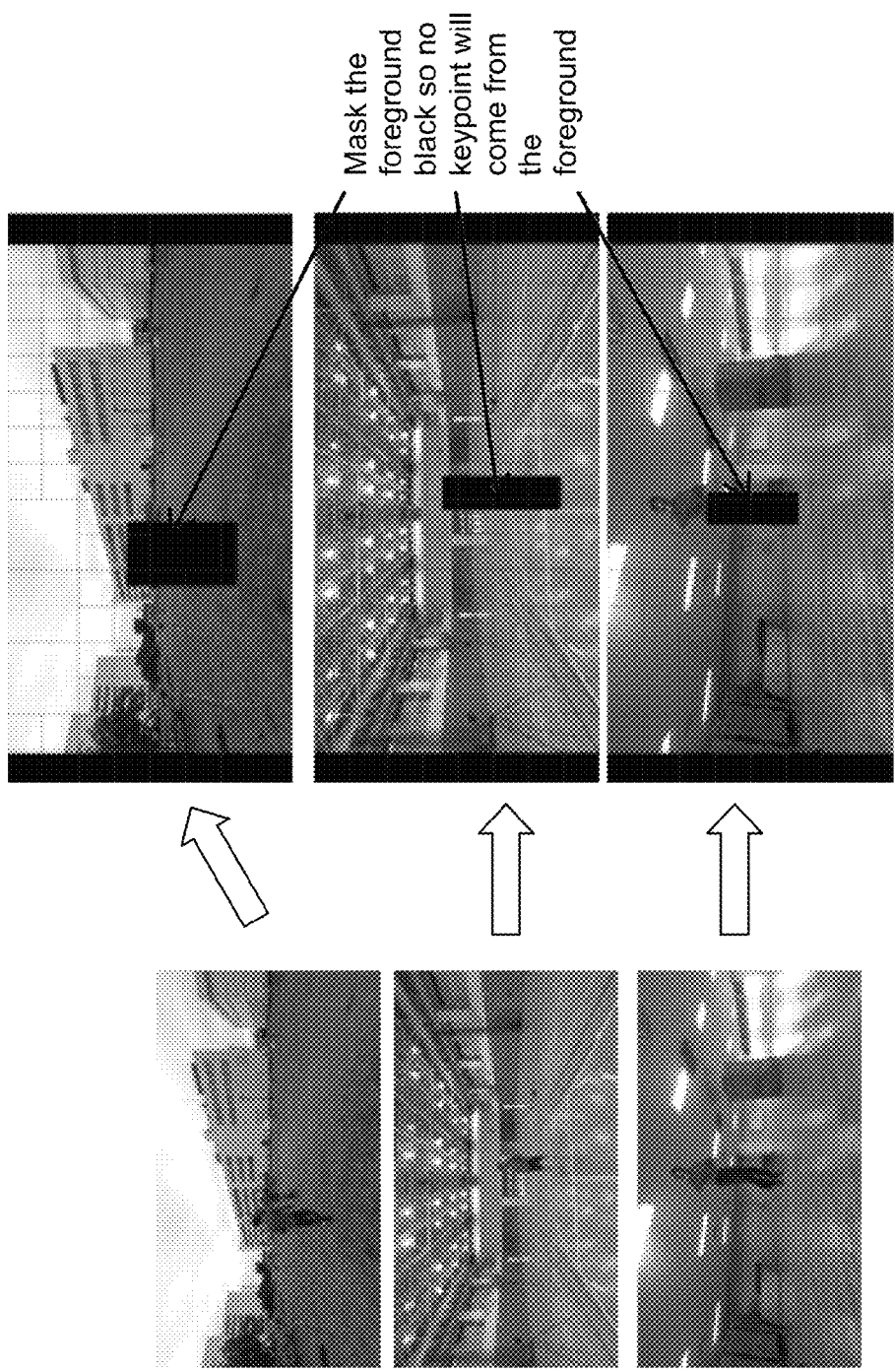
FIG. 7 illustrates images of keypoint subsampling using Agrid for background according to some embodiments.
Figure 8:
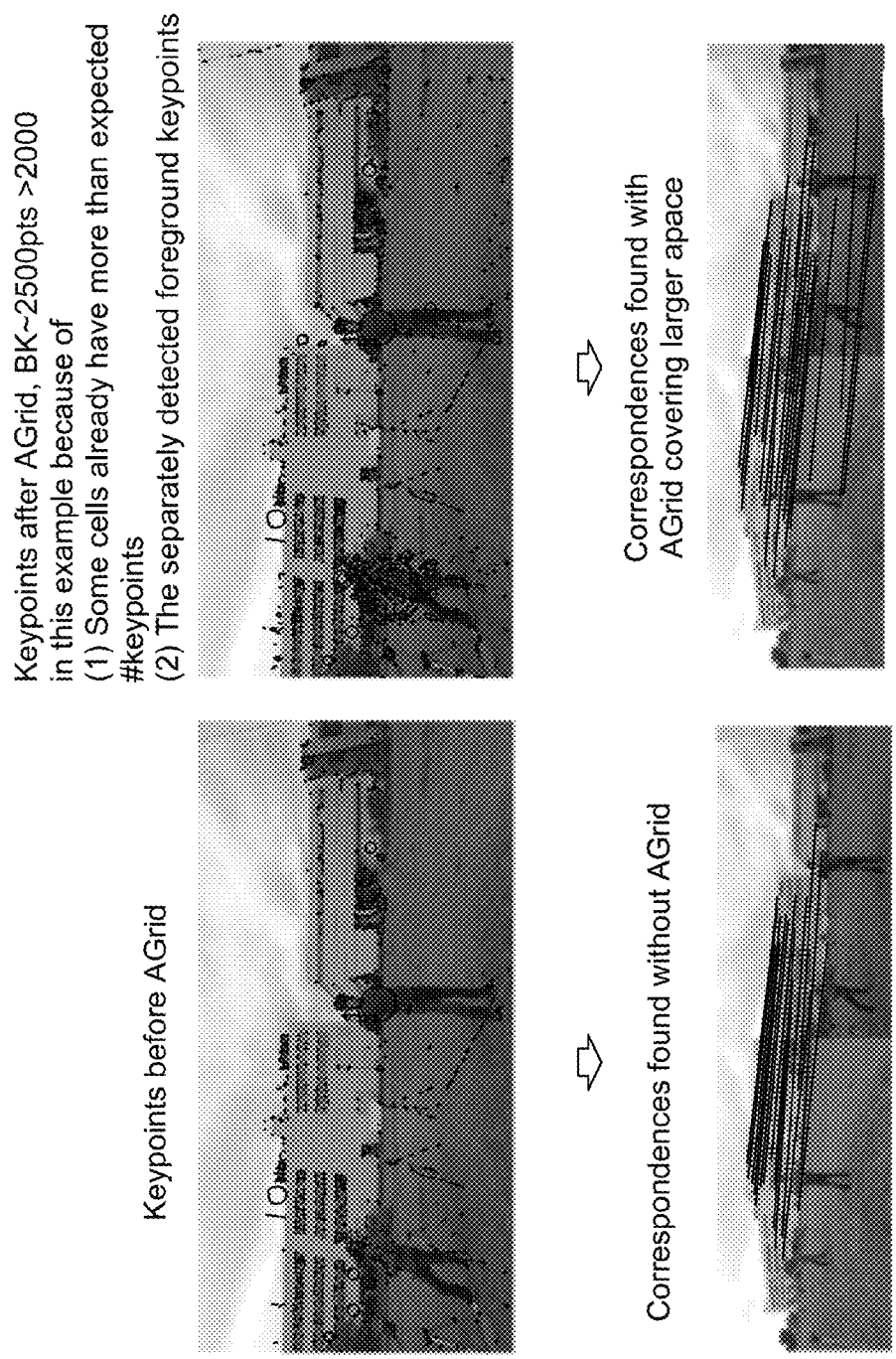
FIG. 8 illustrates images of keypoint subsampling using Agrid according to some embodiments.

FIG. 7 illustrates images of keypoint subsampling using AGrid for background according to some embodiments. FIG. 8 illustrates images of keypoint subsampling using AGrid according to some embodiments.

For keypoint subsampling, foreground and background AGrid, the input is image i and $R_i$ from the reliable moving objects substep. The foreground SIFT is used to determine K_obj for $R_i$. AGrid for the enlarged spatial keypoint distribution in ~$R_i$ includes: initially setting keypoints K_0 by SIFT detector (no grid) to obtain the keypoints in ~$R_i$ detected at the whole image scale, and starting from the whole image, quadtree decomposition is applied: divide a block if the σ of intensity>σ_th. The final divided units are referred to as "cells." Each cell has the same minimum #keypoints=Expected #keypoints/#cells. Only do a second SIFT keypoint detection for the cells not yet with enough keypoints by K_0. This gives K_1. Fill each cell to the minimum #keypoints by K_1. The keypoints used to fill are K_1'. Aggregate K_obj, K_0 and K_1' as $K_i$. The output is $K_i$ containing the location, scale and orientation information.

Keypoint descriptor extraction is used for computing a descriptor to represent each keypoint so it is able to be discriminated by the following matching. Background and the centered moving objects have different dynamic ranges of viewing angle changes because: different depth (Moving objects has similar depths to all cameras) and different FOV (Moving objects occupies smaller FOV due to our assumptions), so different descriptors are applied to different regions for better performance.

Keypoint descriptor extraction receives image i, $K_i$ from keypoint subsampling containing the keypoints of the image, and the output is descriptors of $K_i$. For moving object keypoints, $\forall k_{i,m} = (x_{i,m}, y_{i,m}, s_{i,m}, o_{i,m}) \in K_i$, $x_{i,m}$ and $y_{i,m}$ inside ~$R_i$, are determined using BRISK keypoint detector by OpenCV. Scales and orientations are from SIFT which utilized 60 sampling positions, 512 chosen pairs.

For the background regions ($\forall k_{i,m} \subset K_i$, x and y coordinates of $k_{i,min}$ inside ~$R_i$), FREAK keypoint detector by OpenCV is used. Scales and orientations are from SIFT. 43 sampling positions and 512 chosen pairs are used.

Pairwise correspondence utilizes input $R_i$ from the reliable moving objects substep, descriptors of $K_i$ from keypoint descriptor extraction substep and i=1~$N_c$. The output is $M_{ij}$=correspondences between $c_i$ and $c_j$, i,j=1~$N_c$. The Hamming distance is used following the BRISK and FREAK descriptors selected:

Hamming distance H(f1,f2)=bit sum(f1⊕f2), where f1 and f2 are binary vectors (descriptors). Distance (dissimilarity) $D(k_{i,m}, k_{j,n})$ between two feature points $k_{i,m}$ and $k_{j,n}$ that are able to be defined as $H(f_{i,m}, f_{j,n})$, where $f_{i,m}, f_{j,n}$ are the descriptors of $k_{i,m}$ and $k_{j,n}$, respectively. Matching $k_{i,m}$ with $K_j$ is to find $$k_{j,n^*} = \min_n D(k_{i,m}, k_{j,n}), k_{j,n} \in K_j$$

then ($k_{i,m}$, $k_{j,n}$*) is a match.

Figure 9:
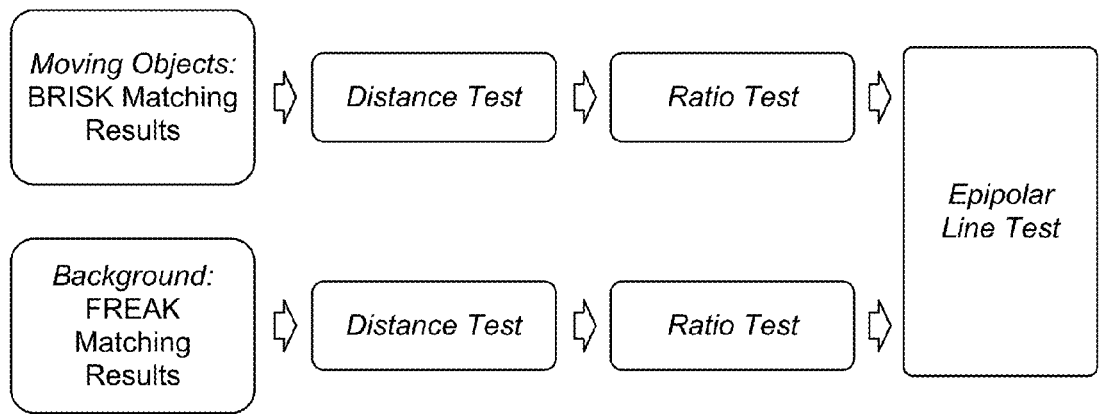
FIG. 9 illustrates a diagram of pairwise correspondence according to some embodiments.
Figure 10:
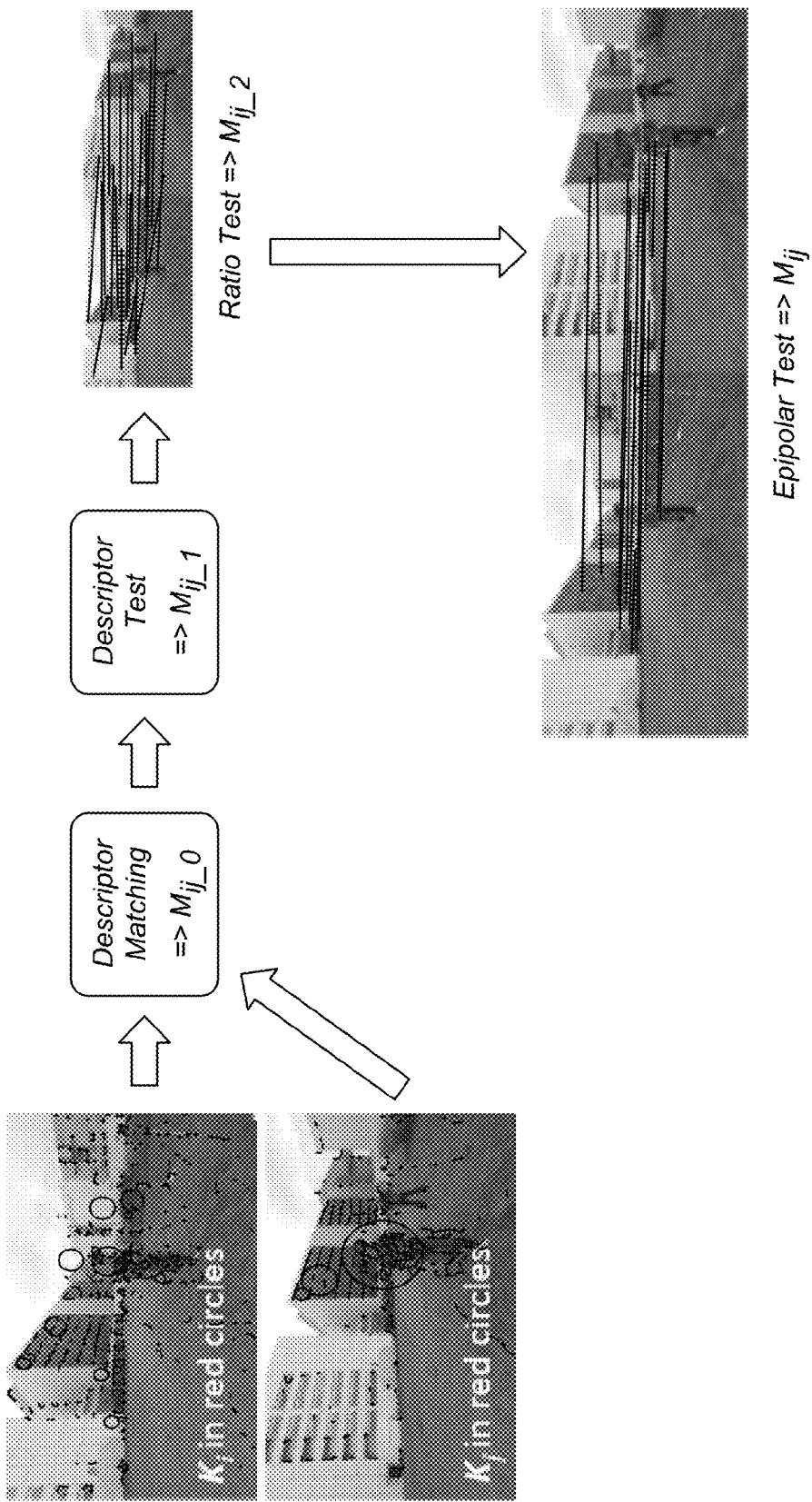
FIG. 10 illustrates a diagram of pairwise correspondence according to some embodiments.

$M_{ij\_0}$ is the set of the best matches by FREAK/BRISK Hamming distance. Three outlier removal mechanism are used: distance test, ratio test and epipolar line test. FIG. 9 illustrates a diagram of pairwise correspondence according to some embodiments. FIG. 10 illustrates a diagram of pairwise correspondence according to some embodiments.

For the pairwise correspondence, a distance test is implemented which removes the correspondences with lower descriptor matching scores (e.g., appearance), since the low descriptor matching scores highly relate to bad correspondences. $M_{ij\_0}$ is input by the FREAK/BRISK Hamming matching. The distance tests involves putting the correspondence ($k_{i,m}$, $k_{j,n}$) from $M_{ij\_0}$ to $M_{ij\_1}$ if $D(k_{i,m}, k_{j,n}) \leq$ Th, where Th=200 for both FREAK and BRISK. The output is $M_{ij\_1}$.

For the pairwise correspondence, a ratio test is implemented which retains only the good correspondences without ambiguity. This is effective for repeated patterns and remaining distinctive correspondences. 2-NN distance ration comparison is utilized. The best two matches (e.g., minimum distances) are found for a keypoint $k_{i,m}$ from $C_i$ in $C_j$: $k_{j,n}$ and $k_{j,q}$, ($k_{i,m}$, $k_{j,n}$)∈$M_{ij\_1}$. The larger the ratio, the better the discriminative power of the keypoint. The ratio test includes the correspondence ($k_{i,m}$, $k_{j,n}$) in $M_{ij\_2}$ if D($k_{i,m}$, $k_{j,q}$)/D($k_{i,m}$, $k_{j,n}$)>Th, where Th=1.3.

For pairwise correspondence, an epipolar test is implemented to remove outliers based on geometry constraints and statistics of correspondences (e.g., #inliers is larger than #outliers). The input of the epipolar test is $M_{ij\_2}$ (process background/moving objects keypoints together). The process lets F be the fundamental matrix between $C_i$ and $C_j$, and $x_i$, $x_j$ are a pair of 2D corresponding point coordinates in the images of $C_i$ and $C_j$, respectively, giving:

$$x'_i F x_j = 0$$

Figure 11:
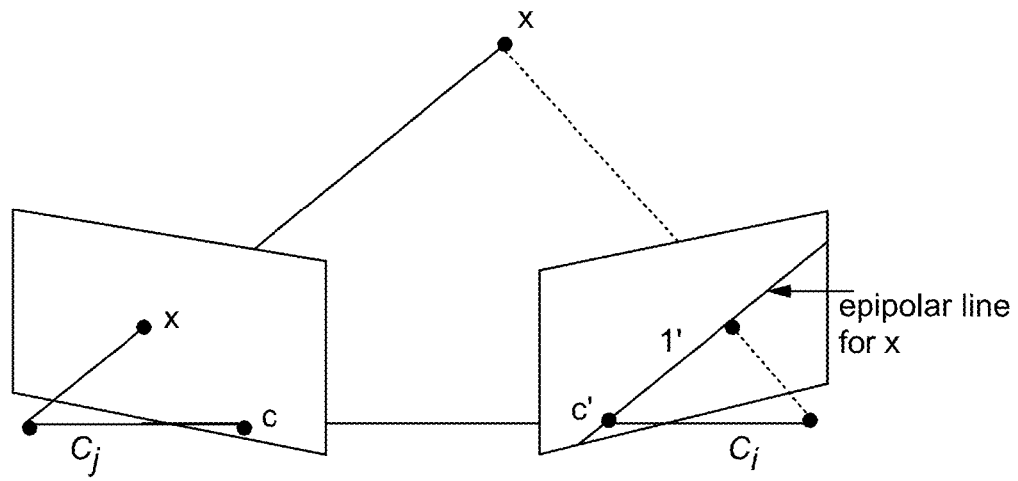
FIG. 11 illustrates a diagram of $Fx_j$ defining an epipolar line in the image of $C_i$ according to some embodiments.
Figure 12:
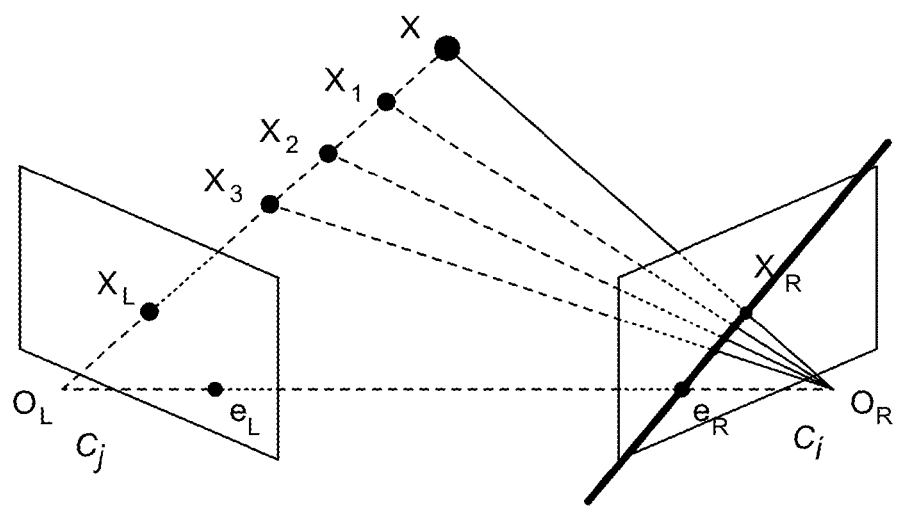
FIG. 12 illustrates a diagram of checking the point-line distance in $C_i$ and accepting the correspondences with distance≈0 according to some embodiments.

For pairwise correspondence, geometrically, as $Fx_j$ defines an epipolar line in the image of $C_i$ as shown in FIG. 11, the point-line distance in $C_i$ is able to be checked, and the correspondences with distance ≈0 are accepted as shown in FIG. 12.

Eight correspondences are randomly chosen to generate a hypothesis of F. The best hypothesis $\hat{F}$ is chosen with the most correspondences satisfying $x'_i \hat{F} x_j = 0$. The output of pairwise correspondence is $M_{ij}$ which are correspondences between $C_i$ and $C_j$ satisfying $\hat{F}$.

Figure 13:
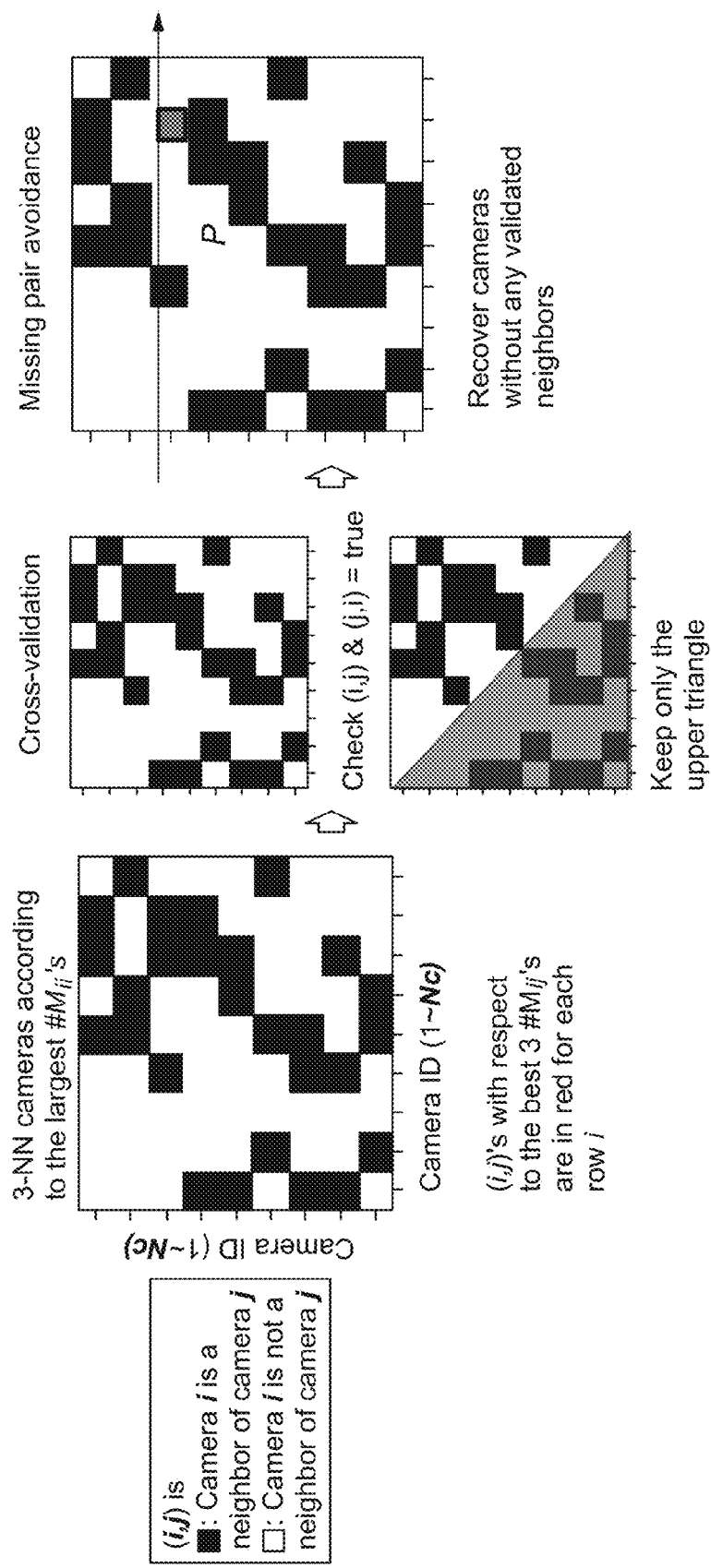
FIG. 13 illustrates a diagram of neighboring camera identification according to some embodiments.

Neighboring camera identification (306) is used to obtain the possible neighboring camera pairs to reduce the number of pairs to check in the neighboring camera position step, the camera list topology deduction step and other advanced camera network analyses. FIG. 13 illustrates a diagram of neighboring camera identification according to some embodiments.

Figure 14:
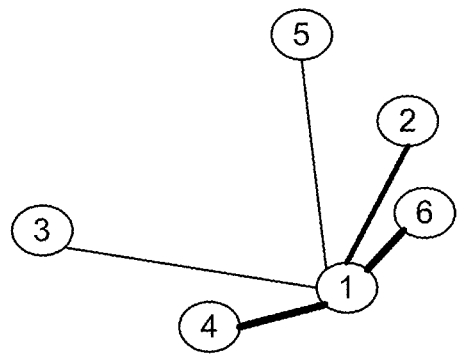
FIG. 14 illustrates an example of correspondence according to some embodiments.

For each camera, the candidates of neighboring cameras by k-NN are found. For all cameras, the candidates are cross validated, and the cameras without any associated candidates by NN are remedied. FIG. 14 illustrates an example of correspondence according to some embodiments. The thickness of an edge is proportional to the measure of correspondences between the two cameras. $C_4$ and $C_6$ are the neighbors of $C_1$. $C_2$ is also considered a neighbor of $C_1$ by 3-NN.

Figure 15:
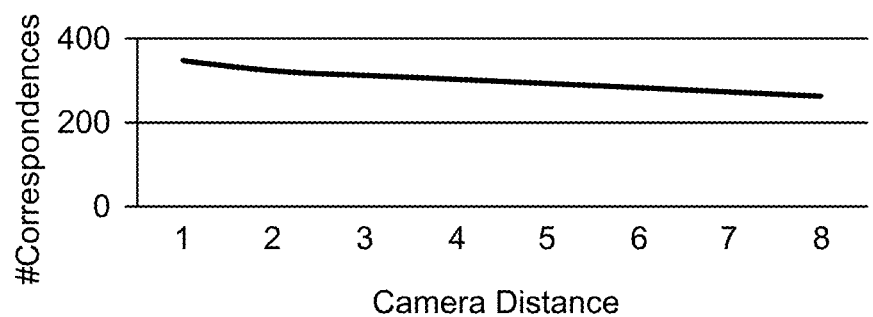
FIG. 15 illustrates an example of $M_{ij}$'s for camera i respective to the distances between camera i and camera j according to some embodiments.

For neighboring camera identification, the number of correspondences between two cameras are measured since under the inward constraint, the overlap areas between two cameras is proportional to the camera distance. FIG. 15 illustrates an example of $M_{ij}$'s for camera i respective to the distances between camera i and camera j according to some embodiments. #$M_{ij}$ is used because of the closeness of camera i and j ∝ #$M_{ij}$.

The neighboring camera identification receives all $M_{ij}$'s from the pairwise camera correspondence extraction as input. The #$M_{ij}$ is counted for all combinations of i and j. #$M_{ij}$ is assumed to equal #$M_{ji}$ so only N(N−1)/2 camera pairs are calculated, although $M_{ij}$ does not equal $M_{ji}$. For camera i, its k-NN cameras are found according to the largest #$M_{ij}$'s. Cross-validation is performed so a k-NN camera j of i is kept if i is also a k-NN camera of j. The kept cameras are referred to as the neighbors of camera i. If a camera i has no neighbors found in the cross-validation step, camera j is kept with the largest #$M_{ij}$ as its only neighbor. An $N_c \times N_c$ binary map P is output. Each row i represents the neighboring cameras of $C_i$, e.g., P(i,j)=1 if camera j is a neighboring camera of camera i.

Neighboring camera positioning (308) is used to extract the local relative positions between the neighboring camera pairs and is able to be used for inferring camera topology or constraining the camera parameter/3D structure computations (e.g., SfM). The neighboring camera positioning decides the relative position (left or right) between each neighboring camera pair output by neighboring camera identification. All roll angles are equal to zero. Only slight tilt angles so the horizon is roughly at the middle of the image height are used. The upper half of the background is used which is assumed to be higher than the ground.

FIG. 16 illustrates a diagram of an undirected graph to a directed graph according to some embodiments. Although some neighboring connections may be missed, there is a trade-off between the larger k-NN and computational efficiency. If sign(v_move−v_bg)=0, $P_{LR}(i,j)$=0 is kept and camera list topology deduction is able to recover it.

In the neighboring camera positioning, motion disparity between the background and the moving objects is determined since the depths of moving objects should be shorter than most background areas. The parallax between two cameras leads them to different degree of position changes. It is also valid to use only background motions if the inward constraint is strictly followed.

In the neighboring camera positioning, a moving object area R from background extraction, all $M_{ij}$'s from pairwise camera correspondence extraction, and P from neighboring camera identification are inputs.

Figure 17:
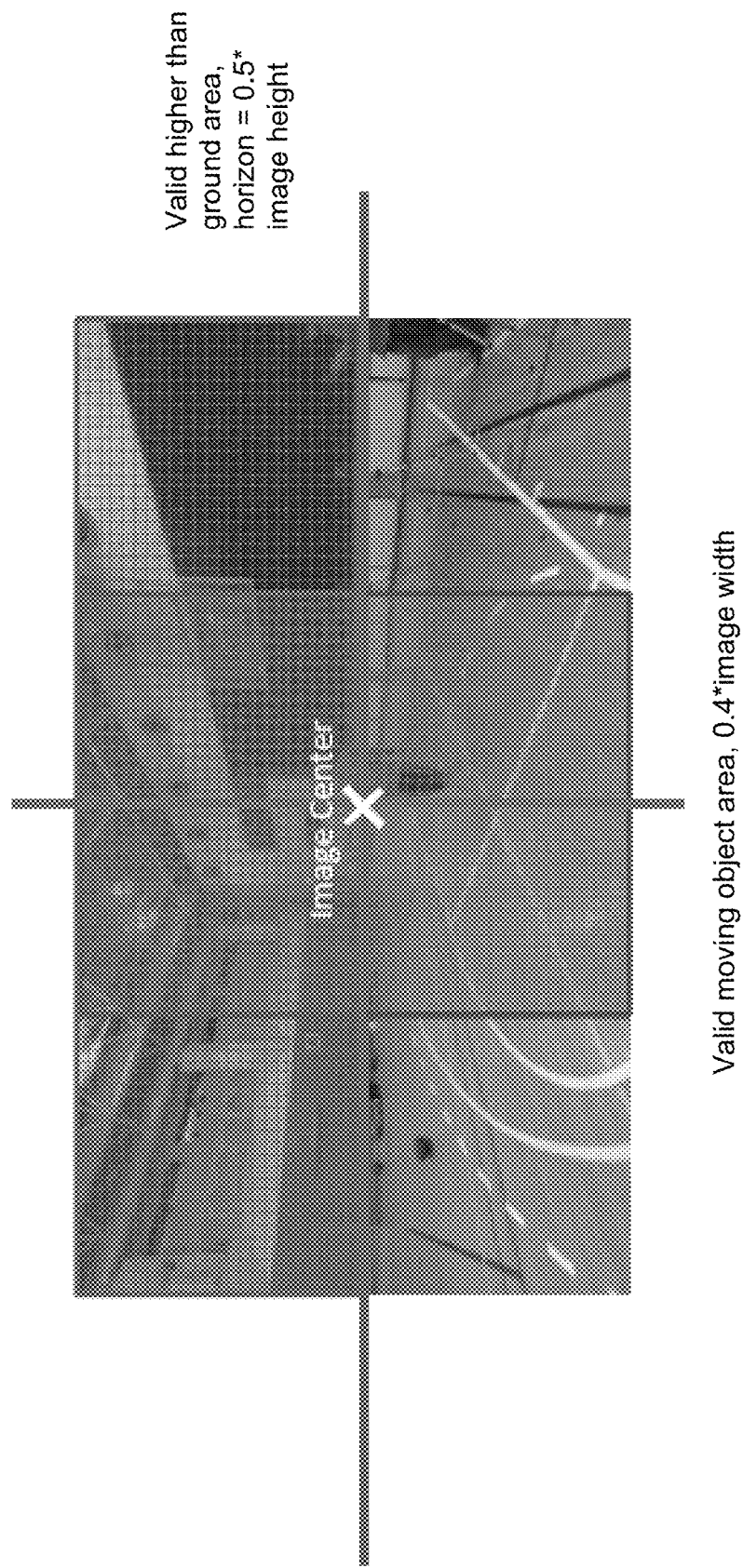
FIG. 17 illustrates an image separated into sections according to some embodiments.

For each P(i,j)=true,
    for each correspondence m∈$M_{ij}$
        //compute the x-coordinate difference between the two keypoints of m direction(m)=x-coordinate ($k_{j,m}$)−x-coordinate($k_{i,m}$);
    End
End FIG. 17 illustrates an image separated into sections according to some embodiments.

For all m's ⊂ R, 0.3*image width<=x-coordinate($k_{j,m}$), x-coordinate ($k_{i,m}$)<=0.7*image width, compute v-move=mean(direction(m));

For all m's ⊂ R, 0.5*image height>=x-coordinate($k_{j,m}$), x-coordinate ($k_{i,m}$), the major direction d is decided by the larger #(direction(m)>0 and #(direction(m)<0). Compute v_bg=mean(direction(m)∈d);

$$P_{LR}(i,j) = \text{sign}(v\_move - v\_bg);$$

The output is a tri-valued $N_c \times N_c$ matrix $P_{LR}$·$P_{LR}$(ij)=1 if camera j is left to camera i; $P_{LR}$(i,j)=−1 if camera j is right to camera i; otherwise 0.

Figure 18:
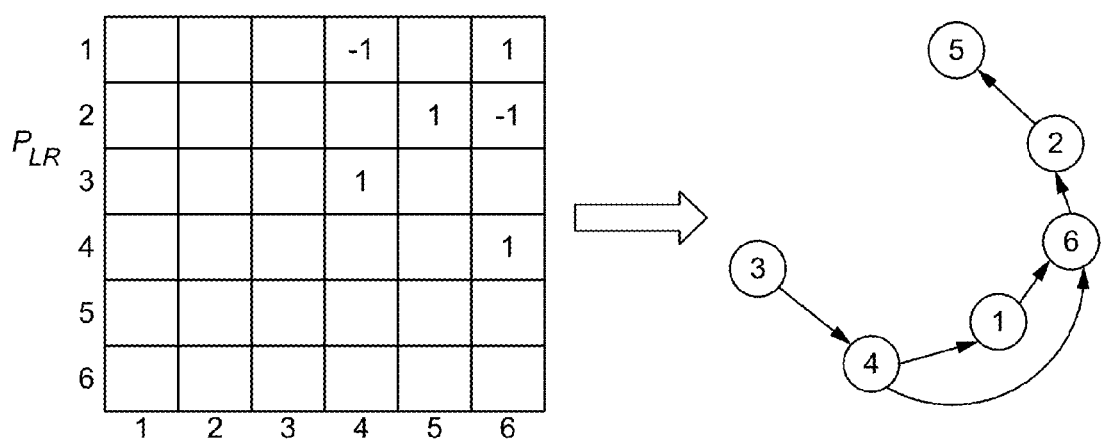
FIG. 18 illustrates an example of $P_{LR}$ defining a unique directed graph according to some embodiments.

$P_{LR}$ defines a unique directed graph. FIG. 18 illustrates an example of $P_{LR}$ defining a unique directed graph according to some embodiments.

Topology deduction (310) includes multiple substeps: relational swapping with loop resolving, nearest neighbor refinement and post-relational swapping. Topology deduction enables the derivation of the global ordering of cameras by the local pairwise directional relations and error detection and recovery.

Figure 19:
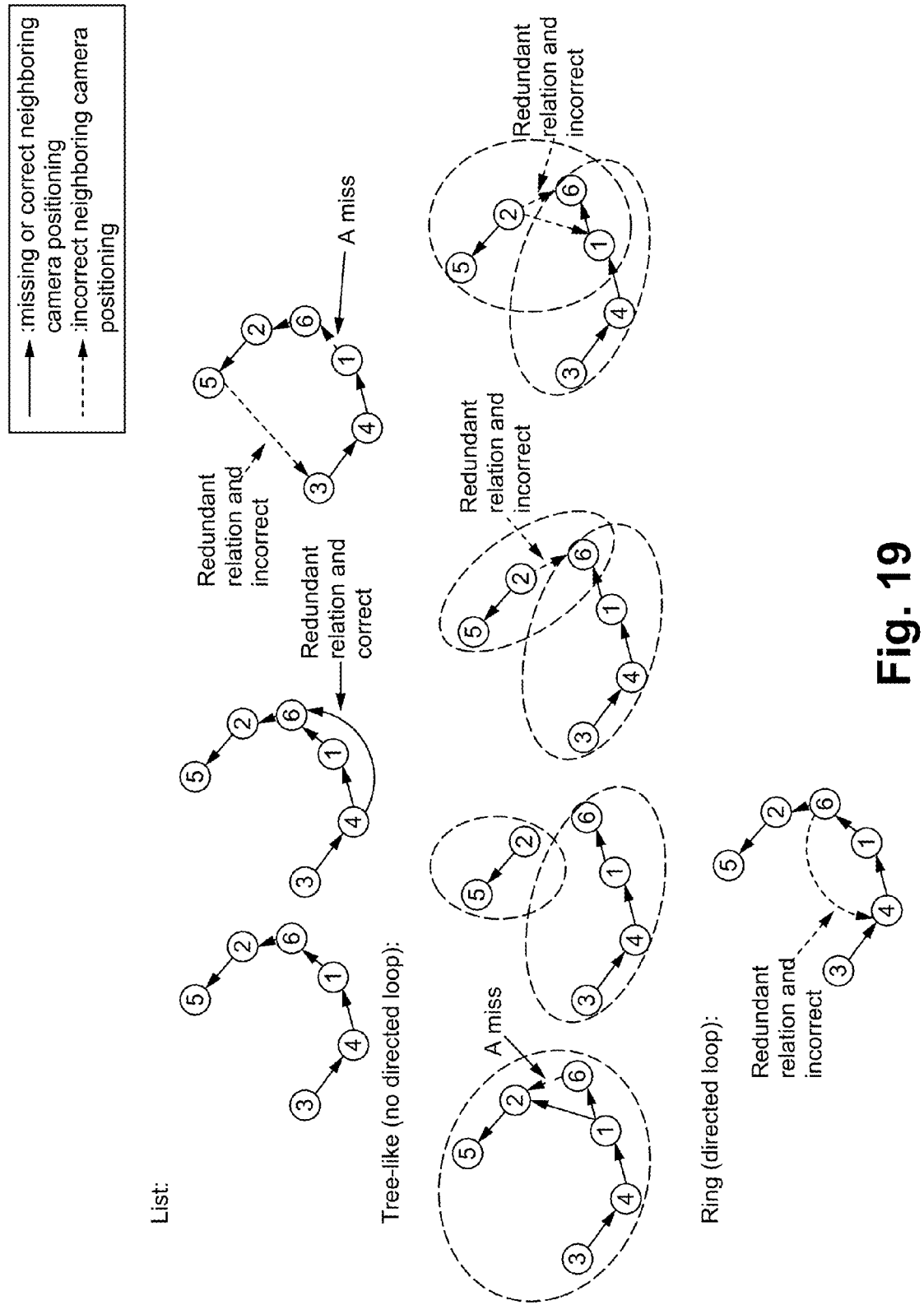
FIG. 19 illustrates multiple types of topologies by $P_{LR}$ according to some embodiments.

FIG. 19 illustrates multiple types of topologies by $P_{LR}$ according to some embodiments. This list topology is preferred. Tree-like (no directed loop) topology may miss some camera relations or contain errors. Ring (directed loop) topology may have at least one error relation. A whole graph is able to be a combination of the three types.

Relational swapping with loop resolving starts from an arbitrary camera ordering, checks each pair(i,j) where $P_{LR}$(i,j)≠0. For each checked (i,j), swap the ordering of camera i and j if their relative position mismatches $P_{LR}$(i,j) in the neighboring camera position step, record the relative direction $P_{LR}$(i,j) at i and j; propagate the farther cameras IDs (camera ID=i for $C_i$) and directions to j from i which have the same relative direction as $P_{LR}(i,j)$; if a camera has both right and left relative directions recorded in j, there is a loop, and solve the loop by removing the weakest $P_{LR}(i,j)$ in the loop, and clear all propagated recorded. Repeat the process until there is no change or the maximum number of iterations is met. Topology T is the output. $P_{LR}$ is the only input defining the graph, directing the swapping, and giving the relations to be propagated.

Figure 20:
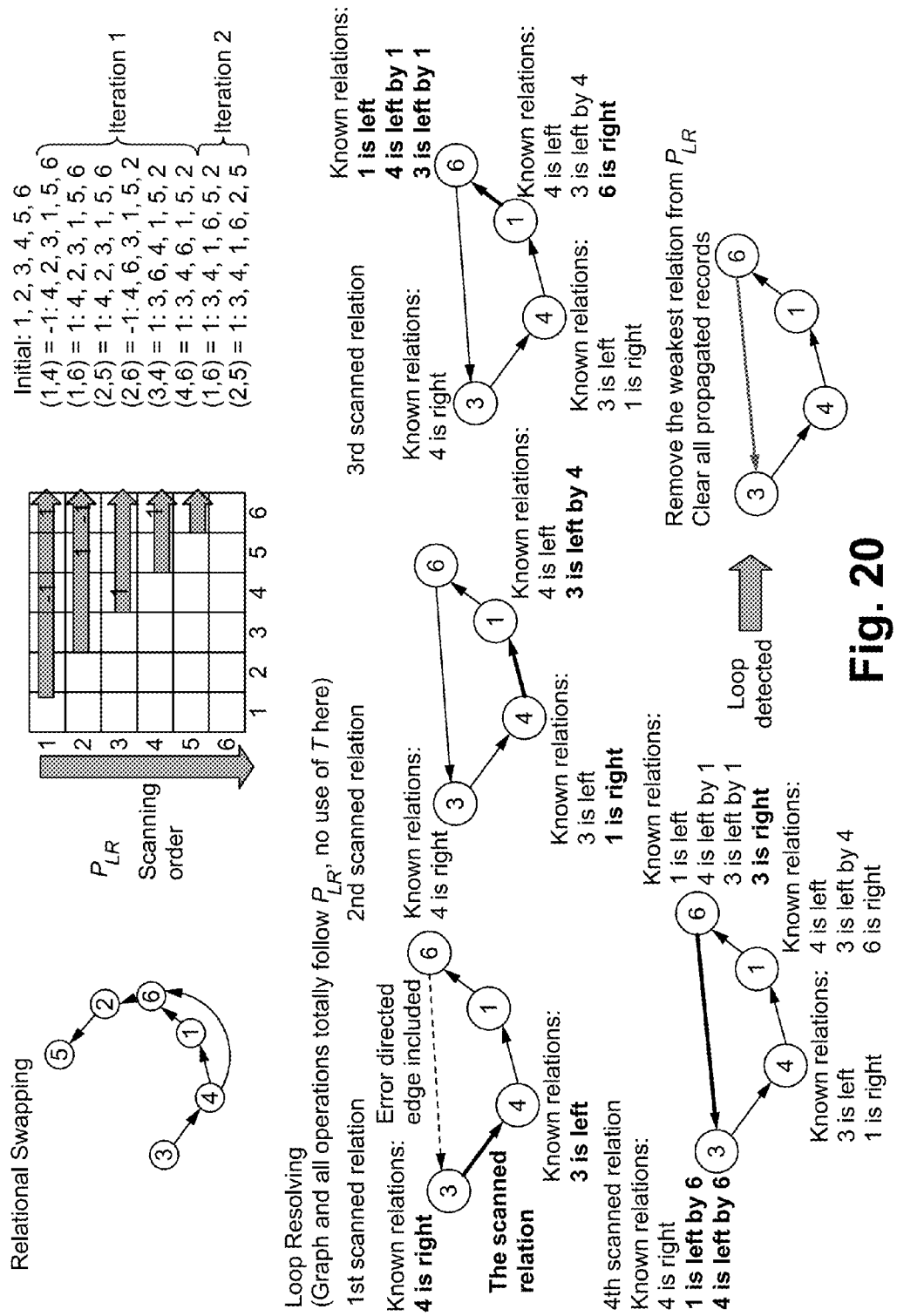
FIG. 20 illustrates diagrams of relational swapping with loop resolving according to some embodiments.

FIG. 20 illustrates diagrams of relational swapping with loop resolving according to some embodiments.

Relational swapping with loop resolving receives $P_{LR}$ and all $M_{ij}$'s by pairwise camera correspondence extraction as inputs.

Initial $T_0=1 \ldots N_c$;
    changed=false;
    While ite<max_ite
      for i=1 ... $N_c$
        for j=i+1 ... $N_c$
          if $P_{LR}(i,j) \neq 0$
            Swap i,j in $T_0$ if the position ordering of $C_iC_j$ is wrong
            Propagate the recorded camera Ids at i to j if they are at the opposite directions of i
            Each camera maintains a record of camera Ids and their relative directions propagated end
        end
      end
    if !changed
      break;
    else
      ite++; changed = false;
    end
    end The output is $T_0$ (an ordering list of all cameras) and a modified $P_{LR}$.

Nearest neighbor refinement is used to resolve the tree-like topologies after relational swapping with loop resolving. Given $T_0$ from relational swapping with loop resolving, it is not unique if the relations by $P_{LR}$ are not sufficient (tree-like). FIG. 21 illustrates a diagram of neighbor refinement according to some embodiments. By introducing the neighboring camera position the possible solutions are constrained. Two types of information are used to recover the unique solution. $P_{LR}$ based on k-NN implies the ordering difference between the neighboring cameras and has an upper bound of k/2. $M_{ij}$ is able to be upgraded to directional relation as another constraint.

In the nearest neighbor refinement, only the Tree-like $P_{LR}$ activates the inner code (the if statement). The input is $T_0$ from relational swapping with loop resolving, $P_{LR}$ after relational swapping with loop resolving, $M_{ij}$'s from pairwise camera correspondence extraction.

While
      cost_origin using the current $P_{LR}$
      check all consecutive cameras in $T_0$ and compute their directions if their corresponding $P_{LR}=0$ (a missing)
      for i=1:#Cams
        for j=i+1 ... #Cams
          if $P_{LR}(i,j)$ but the positions of camera i and camera j are farther than 2
            Generate 4 possible rearrangements, T_tmp(1) to T_tmp(4) with neighbor window size=2
            for k=1:4
              compute cost_after(k) for each rearrangement;
            end
            Choose the best k which has the largest drop from cost_origin to cost_after(k):
            (1) if only one best T_tmp(k), cost_after(k)<cost_origin, choose it
            (2) if the cost_origin=cost_after(k), further compute the #direction errors of the missing data ing T_tmp(k), and then decide if T_tmp(k) is used,
            (3) if multiple best k's, also compute the #direction errors of the missing data for these T_tmp (k)'s to choose the best one.

Re-assign $T_0$ as T_tmp(k);
            Update cost_origin;
          end
        end
      end
    end The neighbor refinement receives $P_{LR}$ as input. The cost equals positioning error (direction error and neighboring error). Define ordering(i)=position of camera i in the camera list topology T, counted from left to right:
    e.g., ordering (i)=2,
    ordering (k)=3, _i k_____j___
    ordering (j)=8.
Direction error of $$P_{LR}(i, j) = \begin{cases} 1, & \text{if } P_{LR}(i, j) \text{mismatches sign}(ordering(i) - ordering(j)) \\ 0, & \text{otherwise} \end{cases}$$

Neighboring error of $$P_{LR}(i, j) = \begin{cases} 1, & \text{if } abs(ordering(i) - ordering(j)) > D\_th, \\ 0, & \text{otherwise} \end{cases}$$

D_th=ceil(k/2), where k is the k-NN cost=$\Sigma_{\forall i,j, i \neq j}$(direction error of $P_{LR}(i,j)$+neighboring error of $P_{LR}(i,j)$)

e.g., $P_{LR}(i,k)=1$, D_th=2
FIG. 22 illustrates a diagram of neighbor refinement according to some embodiments.

If two cameras $C_i$ and $C_j$ are neighbors in a camera list topology T, so abs(ordering(i)–ordering (j))=1, then $P_{LR}(i,j)$ is a missing data if $P_{LR}(i,j)=0$. FIG. 23 illustrates a diagram indicating missing data according to some embodiments. For any missing data $P_{LR}(i,j)$ in T, $P_{LR}(i,j)=0$. If two topologies T and T' have the same costs, neighboring camera positioning without k-NN constraint is used to estimate the relative directions of all missing data, $\tilde{P}_{LR}(i,j)$'s=±1, in T and T', respectively, and more direction errors are able to be compared. However, $P_{LR}(i,j)=0$ implies $P(i,j)=0$ so such relations are weak and their neighboring errors are ignored. $\tilde{P}_{LR}(i,j)$'s is used temporarily and keep $P_{LR}(i,j)=0$.

Figure 24:
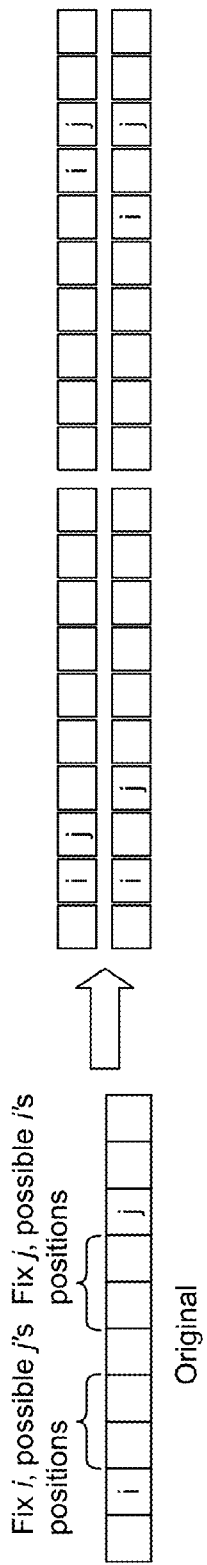
FIG. 24 illustrates a diagram of rearrangement according to some embodiments.
Figure 25:
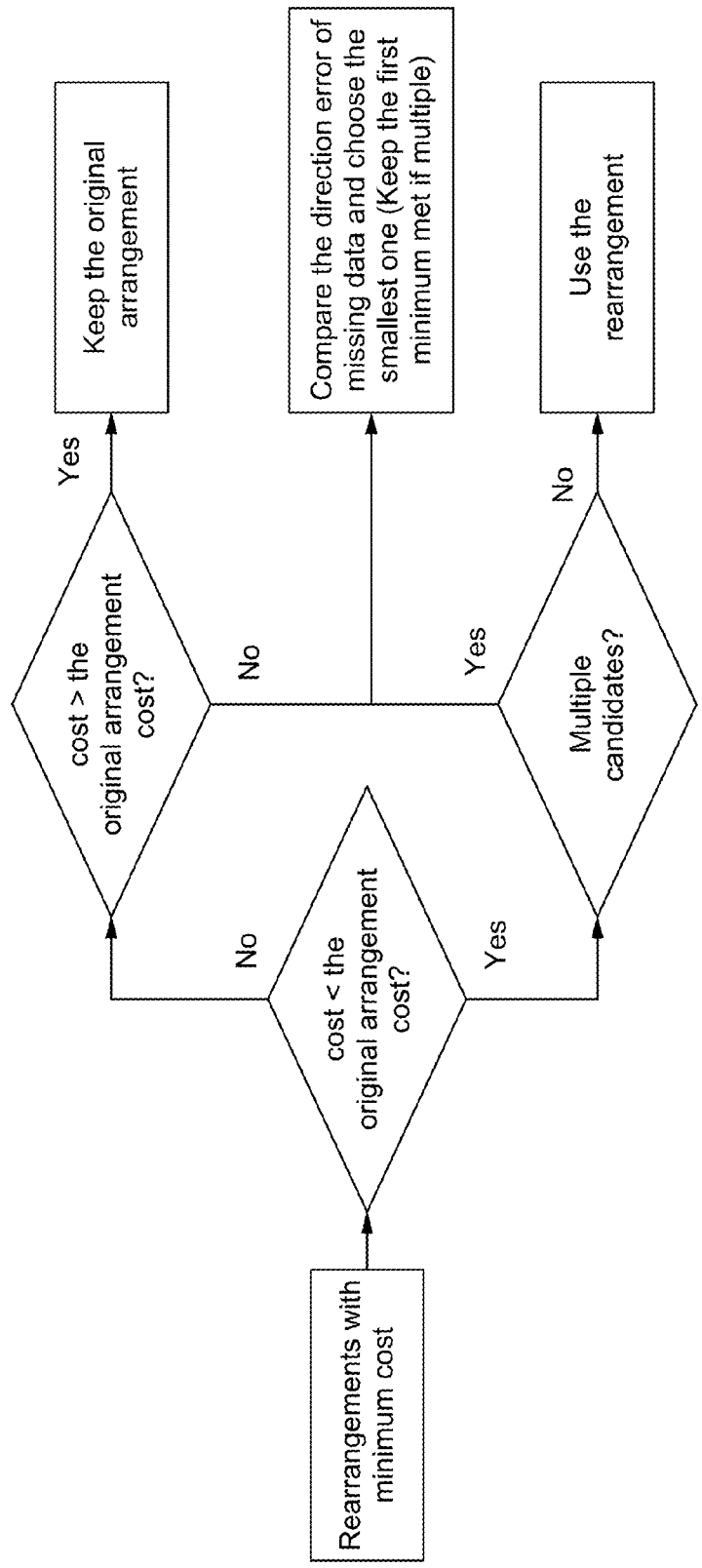
FIG. 25 illustrates a flowchart of rearrangement according to some embodiments.
Figure 26:
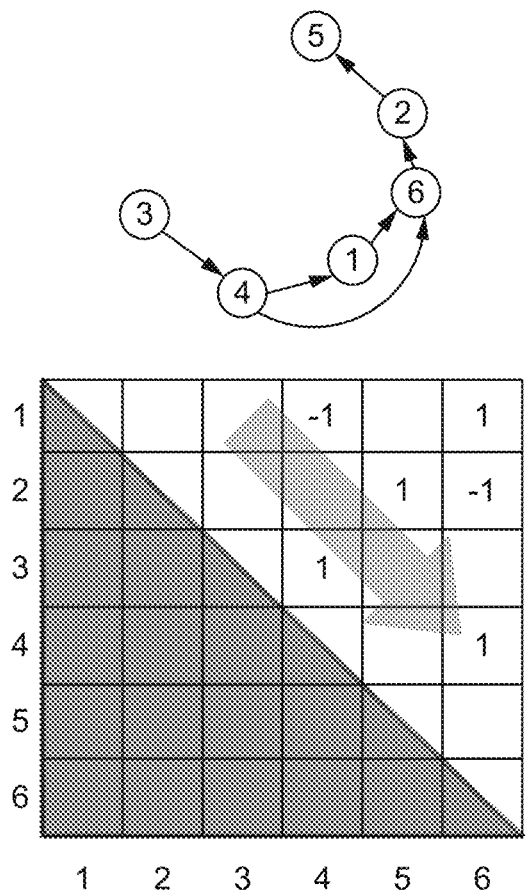
FIG. 26 illustrates a diagram of convergence according to some embodiments.

By 3-NN, the costs of 4 possible rearrangements are compared (e.g., $P_{LR}(i,j)=-1$, so i is left to j, NN window size=ceil(3/2)=2). FIG. 24 illustrates a diagram of rearrangement according to some embodiments. FIG. 25 illustrates a flowchart of rearrangement according to some embodiments.

In post-relational swapping, relational swapping without loop resolving is implemented. This is refinement after nearest neighbor refinement. Input is $T_1$ from nearest neighbor refinement and $P_{LR}$ from relational swapping with loop resolving. The output is T.

Figure 27:
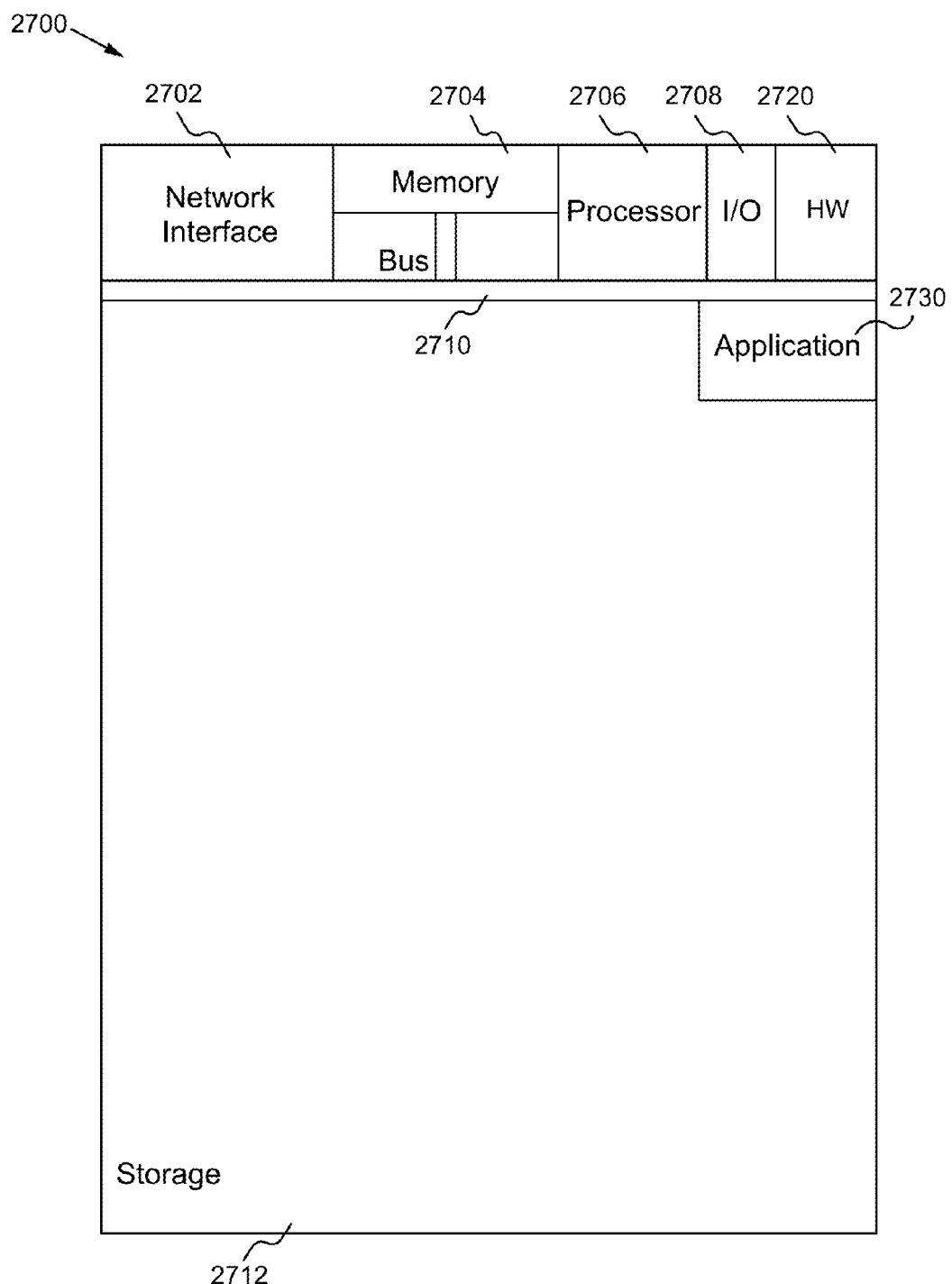
FIG. 27 illustrates a block diagram of an exemplary computing device configured to implement the multiple camera positioning method according to some embodiments.

FIG. 27 illustrates a block diagram of an exemplary computing device configured to implement the multiple camera positioning method according to some embodiments. The computing device 2700 is able to be used to acquire, store, compute, process, communicate and/or display information such as images and videos. In general, a hardware structure suitable for implementing the computing device 2700 includes a network interface 2702, a memory 2704, a processor 2706, I/O device(s) 2708, a bus 2710 and a storage device 2712. The choice of processor is not critical as long as a suitable processor with sufficient speed is chosen. The memory 2704 is able to be any conventional computer memory known in the art. The storage device 2712 is able to include a hard drive, CDROM, CDRW, DVD, DVDRW, High Definition disc/drive, ultra-HD drive, flash memory card or any other storage device. The computing device 2700 is able to include one or more network interfaces 2702. An example of a network interface includes a network card connected to an Ethernet or other type of LAN. The I/O device(s) 2708 are able to include one or more of the following: keyboard, mouse, monitor, screen, printer, modem, touchscreen, button interface and other devices. Multiple camera positioning application(s) 2730 used to perform the multiple camera positioning method are likely to be stored in the storage device 2712 and memory 2704 and processed as applications are typically processed. More or fewer components shown in FIG. 27 are able to be included in the computing device 2700. In some embodiments, multiple camera positioning hardware 2720 is included. Although the computing device 2700 in FIG. 27 includes applications 2730 and hardware 2720 for the multiple camera positioning method, the multiple camera positioning method is able to be implemented on a computing device in hardware, firmware, software or any combination thereof. For example, in some embodiments, the multiple camera positioning applications 2730 are programmed in a memory and executed using a processor. In another example, in some embodiments, the multiple camera positioning hardware 2720 is programmed hardware logic including gates specifically designed to implement the multiple camera positioning method.

In some embodiments, the multiple camera positioning application(s) 2730 include several applications and/or modules. In some embodiments, modules include one or more sub-modules as well. In some embodiments, fewer or additional modules are able to be included.

In some embodiments, the multiple camera positioning hardware 2720 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/ player), a television, a home entertainment system, smart jewelry (e.g., smart watch) or any other suitable computing device.

Figure 28:
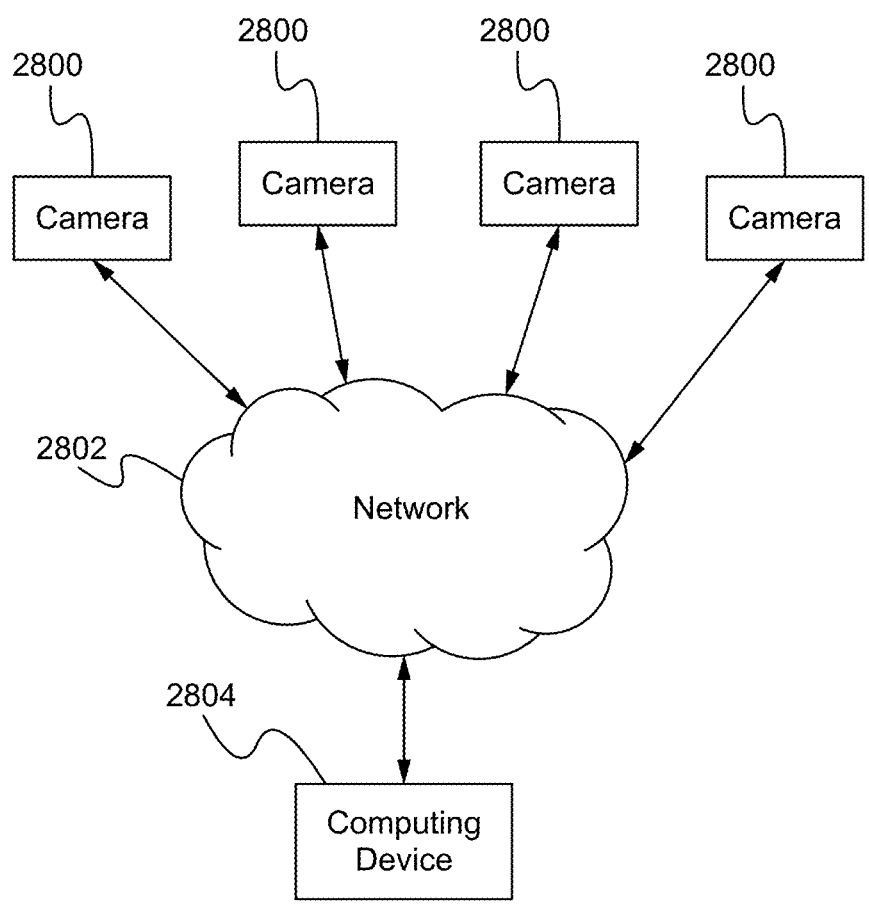
FIG. 28 illustrates a diagram of a network of devices according to some embodiments.

FIG. 28 illustrates a diagram of a network of devices according to some embodiments. A plurality of cameras 2800 are utilized to acquire image/video content. The image/video content is transmitted through a network 2802 (e.g., the Internet, a cellular network or any other network) to a computing device 2804. In some embodiments, the content is transmitted to the computing device directly without a network. The computing device 2804 is configured to perform the camera location ordering method and the multiple camera positioning method described herein. The computing device 2804 is able to be any device such as a server, a personal computer, a smart phone, or any of the devices described herein or any combination of devices described herein. In some embodiments, the computing device 2804 is one or more of the plurality of cameras 2800. In other words, the camera(s) 2800 implements the camera location ordering method.

A method for estimating multiple camera positions by videos or images captured by the cameras is described herein. The method described herein incorporates a pre-computed ordering of cameras so that the method does not require the points seen by three consecutive cameras, but rather five local correspondences between each of the three camera pairs are sufficient to estimate the camera positions.

It is assumed that all of the cameras are positioned toward the subjects so the camera positions form a circle or a convex arc on the ground plane. There are three aspects to the method described herein: 1) obtaining the camera ordering of all cameras, where the ordering means a unique sequence of camera IDs representing their relative left/right position on the ground plane, in a clockwise order; 2) initial camera pair selection and positioning which is used to define the world coordinate and scale; 3) incremental camera position estimation of all other cameras. The method is able to reasonably choose the next camera to estimate in the sense of camera topology, and the locally relative position estimated is able to be easily aligned to the defined world coordinate.

The PnP method is implemented to guarantee the estimated camera positions are able to always align to the world coordinate, while an estimate based on local corresponding points between a camera pair only gives their relative positions and up to a scale. However, a local correspondence between camera pairs is easier to be obtained than the common points seen by three or more cameras, especially when the viewing angle difference between cameras is larger than 15 degrees. Using the knowledge of camera ordering, the spatial constraints are placed on two already estimated cameras and one camera to be estimated (referred to as an unknown camera). The local correspondences provide two relative vectors which intersect at the position of the unknown camera under the constraints. By the world coordinates of the two estimated cameras, the scale parameters are able to be solved easily so the position of the unknown camera is able to be estimated in the defined world coordinate.

The method includes: 1) camera ordering as described in U.S. patent application Ser. No. 14/614,224, filed Feb. 14, 2015, titled, "METHOD OF FAST AND ROBUST CAMERA LOCATION ORDERING," which is hereby incorporated by reference in its entirety for all purposes. 2) initial camera pair selection by the largest number of correspondences among the camera pair, where the camera pairs to be compared are restricted by camera ordering. An implementation of correspondences is the SIFT matching keypoints computed between images.

3) In the incremental camera position estimation, the relative camera position estimation is able to be based on the well-known 5-point essential matrix estimation, or the fundamental matrix by an 8-point algorithm, and then the essential matrix decomposed with known intrinsic parameters. A Random Sample Consensus (RANSAC) technique is usually used in these estimating processes for robust outlier removal. After each estimate of camera position, bundle adjustment is run for global optimizing of all camera positions and the 3D points seen.

Figure 29:
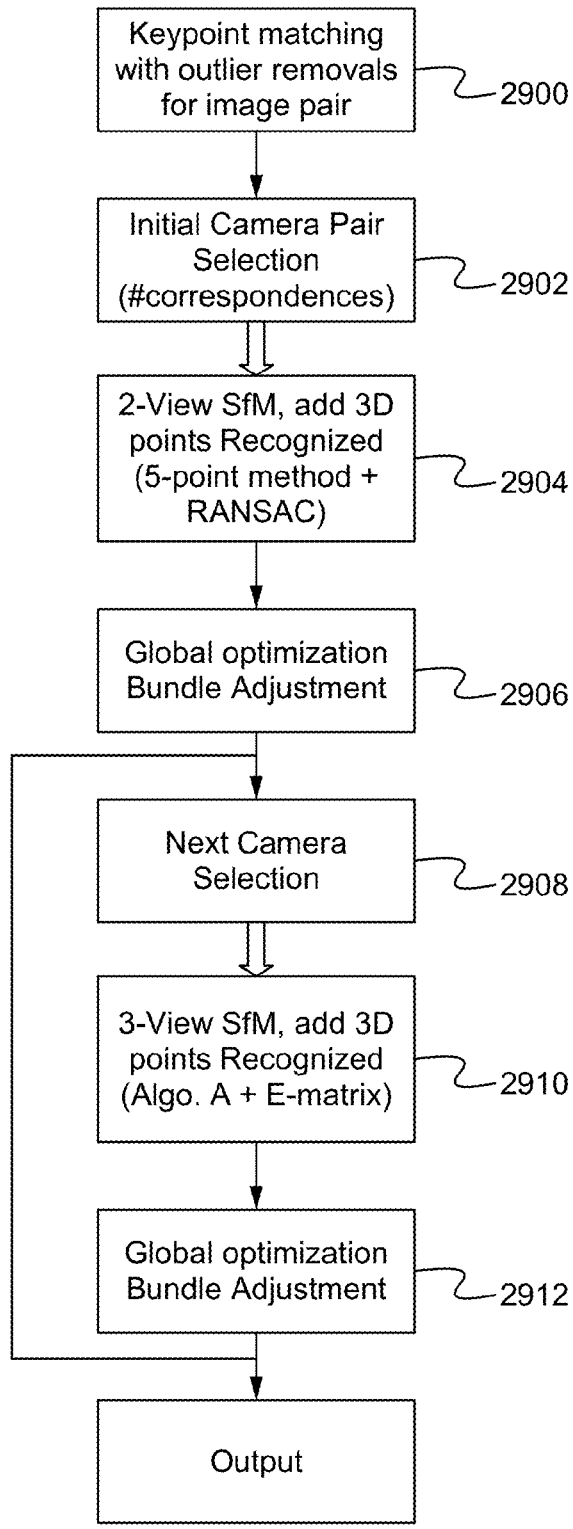
FIG. 29 illustrates a flowchart of the multiple camera positioning method according to some embodiments.

FIG. 29 illustrates a flowchart of the multiple camera positioning method according to some embodiments. In the step 2900, keypoint matching with outlier removals for image pair is implemented. For example, points are located in each camera's image and are matched in any manner such as based on location or content recognition. Additionally, outliers are removed using any implementation. In the step 2902, an initial camera pair is selected. The initial camera pair is able to be selected automatically, manually or a combination thereof. In some embodiments, the method described herein related to camera ordering is utilized in selecting the initial camera pair. In the step 2904, 2-view SfM is implemented, and 3D points are recognized. The 2-view SfM is able to be implemented using any method such as the 5-point method described herein. RANSAC is able to be utilized as well to recognize the 3D points. In the step 2906, global optimization is implemented. Bundle adjustment is utilized for global optimization for optimizing all of the camera positions and the 3D points seen. In the step 2908, the next camera is selected. The next camera is able to be selected in any manner such as the method described herein related to camera ordering. In the step 2910, 3-view SfM is implemented, and 3D points are recognized. The 3-view SfM is able to be implemented using any method such as the triangulation method and the essential matrix method described herein. In the step 2912, global optimization is implemented again. In some embodiments, the separate global optimization results are combined to generate a final result. The result is then output. For example, coordinated videos from multiple cameras are output. In some embodiments, fewer or additional steps are implemented. In some embodiments, the order of the steps is modified.

Figure 30:
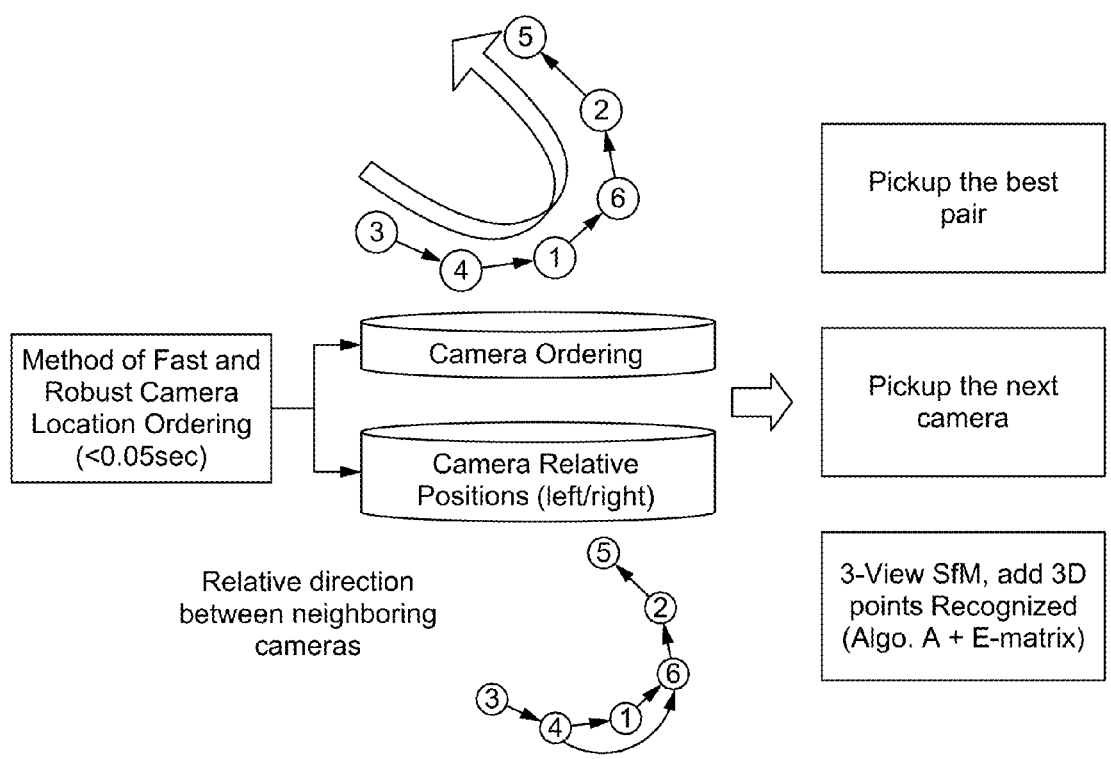
FIG. 30 illustrates a diagram of using camera ordering according to some embodiments.

FIG. 30 illustrates a diagram of using camera ordering according to some embodiments.

A method of fast and robust camera location ordering is described herein. The camera ordering includes the order of the cameras and camera relative positions (e.g., left and right). Using the camera ordering method, the best pair of cameras is able to be determined as well as the next camera. Additionally, 3-view SfM is able to be implemented, and 3D points recognized are added.

FIG. 31 illustrates diagrams of using camera ordering according to some embodiments. For the initial camera pair selection, only the circled pairs are compared (e.g., only adjacent cameras). If performed without ordering, all edges are compared. Based on the comparison, a camera pair is selected, and the position information of those cameras is known. In some embodiments, the pairs are compared by determining if they have any matching content points, and if there is a match, then that pair is selected or the pair with the most matches is selected. For the next camera selection, there are two known cameras, so only two additional pairs are compared. If performed without ordering, all edges are compared. In some embodiments, the next camera is selected by determining if its pair (e.g., cameras 3 and 4 or cameras 1 and 6) has any matching content points, and if there is a match, then that additional camera is selected or the additional camera in the pair with the most matches is selected.

Figure 32:
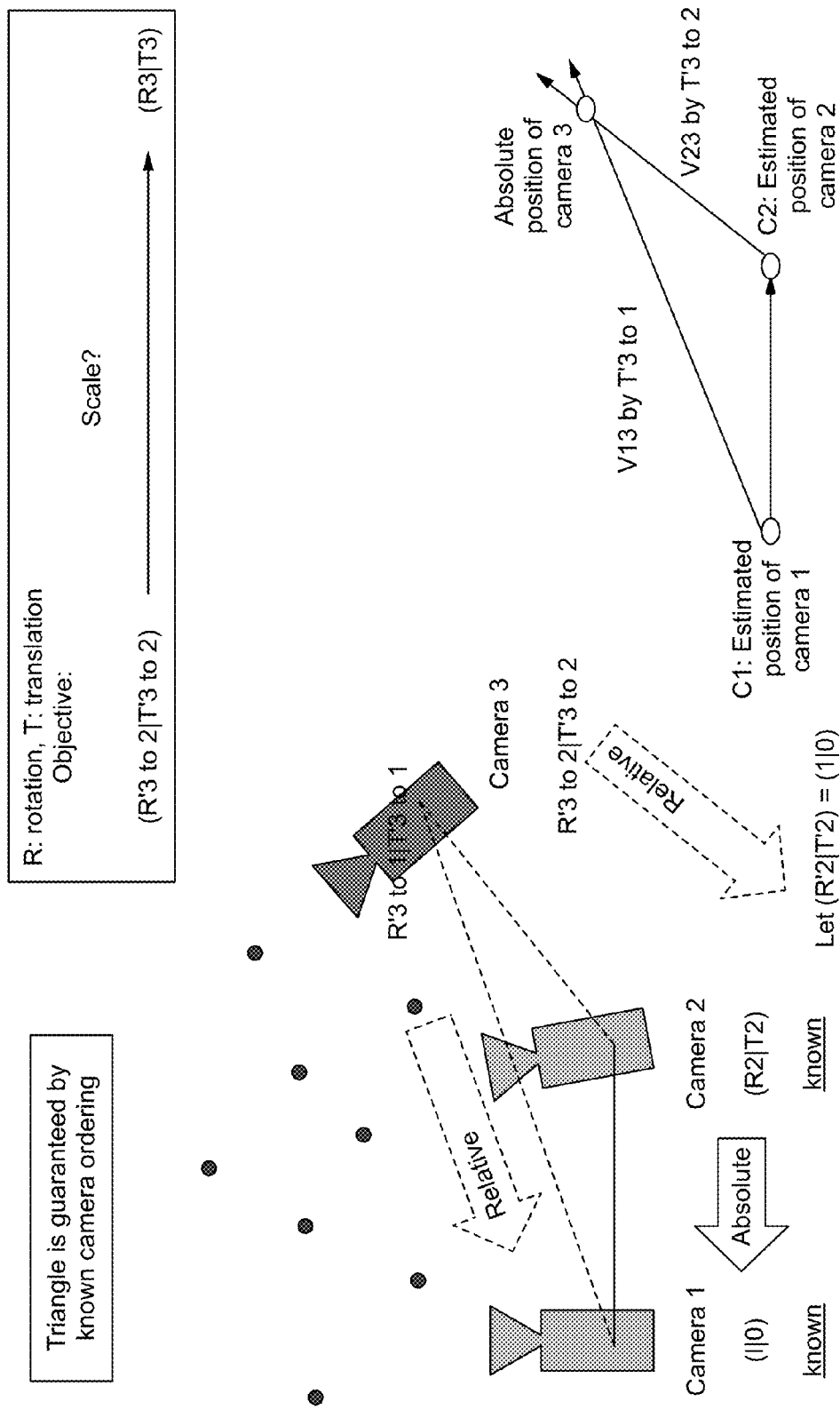
FIG. 32 illustrates a diagram of implementing a triangulation algorithm according to some embodiments.

FIG. 32 illustrates a diagram of implementing a triangulation algorithm according to some embodiments. The triangle is guaranteed by known camera ordering. The rotation and translation (e.g., position) of Camera 1 and Camera 2 are known. Camera 3's rotation and translation are relative to Camera 1 and Camera 2. Camera's rotation is I and translation is 0. Camera 2's rotation is R2 and translation is T2 which is absolute in relation to Camera 1. Camera 3's rotation is R'3 to 1 and translation is T'3 to 1, and R'3 to 2 and T'3 to 2, respectively. The objective is to determine the scale for (R'3 to 2|T'3 to 2)–>(R3|T3). Based on the known position of Camera 1 and the known position of Camera 2, $v_{13}$ and $v_{23}$ are able to be determined, which are able to be used to determine the absolute position of Camera 3.

Figure 33:
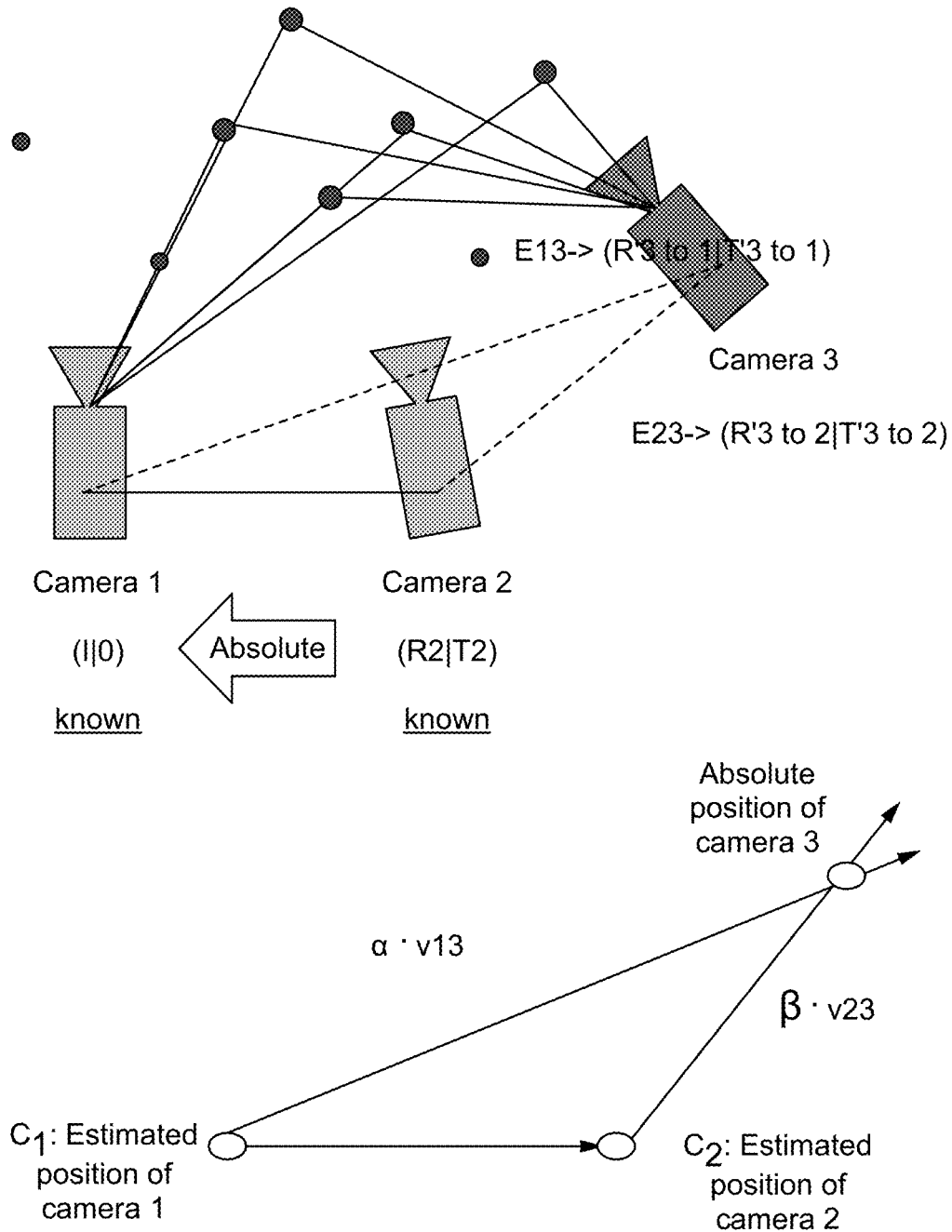
FIG. 33 illustrates a diagram of implementing matrices according to some embodiments.

FIG. 33 illustrates a diagram of implementing matrices according to some embodiments. In some embodiments, a minimum number of key points (e.g., 5) are captured by Camera 1 and Camera 3, and the minimum number of key points are captured by Camera 2 and Camera 3. Using essential matrix E13–>(R'3 to 1|T'3 to 1) and essential matrix 23–>(R'3 to 2|T'3 to 2), the position of Camera 3 is able to be determined.

Based on FIG. 33:

$$\min_{\alpha^*, \beta^*} norm(c_2 + \beta^* v_{23} - c_1 + \alpha^* v_{13})$$

$$\parallel$$

$$(0, 0, 0)$$

The absolute position of Camera 3 is $c_2 + \beta^{**} v_{23}$.

To utilize the multiple camera positioning method described herein, devices such as digital cameras/camcorders are used to acquire images/videos. The multiple camera positioning method is automatically used for arranging videos captured by the cameras/camcorders by time and/or space. The multiple camera positioning method is able to be implemented with user assistance or automatically without user involvement.

In operation, the multiple camera positioning method arranges videos captured by multiple cameras by time and/or space. The multiple camera positioning method is able to be applied to (1) interactive camera selection to view the same event from different viewing angles, (2) automatic camera network organization in video surveillance, (3) automatic organization of video stocks according to their captured locations, and (4) 3D view synthesis using the known camera positions, and 3D scene reconstruction.

Some Embodiments of the Method of Multiple Camera Positioning Utilizing Camera Ordering 1. A method programmed in a non-transitory memory of a device comprising:
   a. obtaining camera ordering of a plurality of cameras;
   b. selecting and positioning an initial camera pair of the plurality of cameras; and
   c. estimating a camera position of a camera not in the initial camera pair of the plurality of cameras using the camera ordering of the plurality of cameras.

2. The method of clause 1 further comprising assuming the plurality of cameras are positioned toward an object so positions of the plurality of cameras form a circle or a convex arc.
3. The method of clause 1 wherein a position of the initial camera pair is known.
4. The method of clause 1 wherein estimating the camera position of the camera not in the initial camera pair utilizes five local correspondences between each of three camera pairs.
5. The method of clause 1 wherein estimating the camera position of the camera not in the initial camera pair is based on a 5-point essential matrix estimation.
6. The method of clause 1 wherein estimating the camera position of the camera not in the initial camera pair is based on a matrix and an 8-point algorithm.
7. The method of clause 1 wherein estimating the camera position of the camera not in the initial camera pair includes bundle adjust after each estimate of the camera position.
8. The method of clause 1 wherein obtaining camera ordering comprises:
   i. performing background extraction;
   ii. performing pairwise camera correspondence extraction;
   iii. identifying neighboring cameras;
   iv. determining neighboring camera positioning; and
   v. performing camera list topology deduction.
9. A system comprising:
   a. a plurality of camera devices each configured for capturing video content; and
   b. a computing device configured for:
      i. obtaining camera ordering of the plurality of cameras;
      ii. selecting and positioning an initial camera pair of the plurality of cameras; and
      iii. estimating a camera position of a camera not in the initial camera pair of the plurality of cameras using the camera ordering of the plurality of cameras.
10. The system of clause 9 wherein the computing device is further configured for assuming the plurality of cameras are positioned toward an object so positions of the plurality of cameras form a circle or a convex arc.
11. The system of clause 9 wherein a position of the initial camera pair is known.
12. The system of clause 9 wherein estimating the camera position of the camera not in the initial camera pair utilizes five local correspondences between each of three camera pairs.
13. The system of clause 9 wherein estimating the camera position of the camera not in the initial camera pair is based on a 5-point essential matrix estimation.
14. The system of clause 9 wherein estimating the camera position of the camera not in the initial camera pair is based on a matrix and an 8-point algorithm.
15. The system of clause 9 wherein estimating the camera position of the camera not in the initial camera pair includes bundle adjust after each estimate of the camera position.
16. The system of clause 9 wherein obtaining camera ordering comprises:
   (1) performing background extraction;
   (2) performing pairwise camera correspondence extraction;
   (3) identifying neighboring cameras;
   (4) determining neighboring camera positioning; and
   (5) performing camera list topology deduction.
17. An apparatus comprising:
   a. a non-transitory memory for storing an application, the application for:
      i. obtaining camera ordering of a plurality of cameras;
      ii. selecting and positioning an initial camera pair of the plurality of cameras; and
      iii. estimating a camera position of a camera not in the initial camera pair of the plurality of cameras using the camera ordering of the plurality of cameras; and
   b. a processing component coupled to the memory, the processing component configured for processing the application.
18. The apparatus of clause 17 wherein the application is further for assuming the plurality of cameras are positioned toward an object so positions of the plurality of cameras form a circle or a convex arc.
19. The apparatus of clause 17 wherein a position of the initial camera pair is known.
20. The apparatus of clause 17 wherein estimating the camera position of the camera not in the initial camera pair utilizes five local correspondences between each of three camera pairs.
21. The apparatus of clause 17 wherein estimating the camera position of the camera not in the initial camera pair is based on a 5-point essential matrix estimation.
22. The apparatus of clause 17 wherein estimating the camera position of the camera not in the initial camera pair is based on a matrix and an 8-point algorithm.
23. The apparatus of clause 17 wherein estimating the camera position of the camera not in the initial camera pair includes bundle adjust after each estimate of the camera position.
24. The apparatus of clause 17 wherein obtaining camera ordering comprises:
   (1) performing background extraction;
   (2) performing pairwise camera correspondence extraction;
   (3) identifying neighboring cameras;
   (4) determining neighboring camera positioning; and
   (5) performing camera list topology deduction.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a device comprising:
   a. obtaining camera ordering of a plurality of cameras;
   b. selecting and positioning an initial camera pair of the plurality of cameras; and
   c. estimating a camera position of a camera not in the initial camera pair of the plurality of cameras using the camera ordering of the plurality of cameras, wherein the camera position is estimated utilizing a distance test, a ratio test and an epipolar line test, wherein the distance test, the ratio test and the epipolar line test are all used to remove outlier information, wherein a binary map stores neighboring camera information, wherein each row of the binary map represents neighboring cameras of the camera.

2. The method of claim 1 further comprising assuming the plurality of cameras are positioned toward an object so positions of the plurality of cameras form a circle or a convex arc.

3. The method of claim 1 wherein a position of the initial camera pair is known.

4. The method of claim 1 wherein estimating the camera position of the camera not in the initial camera pair utilizes five local correspondences between each of three camera pairs.

5. The method of claim 1 wherein estimating the camera position of the camera not in the initial camera pair is based on a 5-point essential matrix estimation.

6. The method of claim 1 wherein estimating the camera position of the camera not in the initial camera pair is based on a matrix and an 8-point algorithm.

7. The method of claim 1 wherein estimating the camera position of the camera not in the initial camera pair includes bundle adjust after each estimate of the camera position.

8. The method of claim 1 wherein obtaining camera ordering comprises:
    i. performing background extraction;
    ii. performing pairwise camera correspondence extraction;
    iii. identifying neighboring cameras;
    iv. determining neighboring camera positioning; and
    v. performing camera list topology deduction.

9. A system comprising:
    a. a plurality of camera devices each configured for capturing video content; and
    b. a computing device configured for:
        i. obtaining camera ordering of the plurality of cameras;
        ii. selecting and positioning an initial camera pair of the plurality of cameras; and
        iii. estimating a camera position of a camera not in the initial camera pair of the plurality of cameras using the camera ordering of the plurality of cameras, wherein the camera position is estimated utilizing a distance test, a ratio test and an epipolar line test, wherein the distance test, the ratio test and the epipolar line test are all used to remove outlier information, wherein a binary map stores neighboring camera information, wherein each row of the binary map represents neighboring cameras of the camera.

10. The system of claim 9 wherein the computing device is further configured for assuming the plurality of cameras are positioned toward an object so positions of the plurality of cameras form a circle or a convex arc.

11. The system of claim 9 wherein a position of the initial camera pair is known.

12. The system of claim 9 wherein estimating the camera position of the camera not in the initial camera pair utilizes five local correspondences between each of three camera pairs.

13. The system of claim 9 wherein estimating the camera position of the camera not in the initial camera pair is based on a 5-point essential matrix estimation.

14. The system of claim 9 wherein estimating the camera position of the camera not in the initial camera pair is based on a matrix and an 8-point algorithm.

15. The system of claim 9 wherein estimating the camera position of the camera not in the initial camera pair includes bundle adjust after each estimate of the camera position.

16. The system of claim 9 wherein obtaining camera ordering comprises:
    (1) performing background extraction;
    (2) performing pairwise camera correspondence extraction;
    (3) identifying neighboring cameras;
    (4) determining neighboring camera positioning; and
    (5) performing camera list topology deduction.

17. An apparatus comprising:
    a. a non-transitory memory for storing an application, the application for:
        i. obtaining camera ordering of a plurality of cameras;
        ii. selecting and positioning an initial camera pair of the plurality of cameras; and
        iii. estimating a camera position of a camera not in the initial camera pair of the plurality of cameras using the camera ordering of the plurality of cameras, wherein the camera position is estimated utilizing a distance test, a ratio test and an epipolar line test to remove outlier information, wherein the distance test removes correspondences with descriptor matching scores below a threshold, wherein the ratio test determines two matches with minimum distances for a keypoint, and wherein the epipolar line test utilizes geometry constraints and statistics of correspondences, wherein a binary map stores neighboring camera information, wherein each row of the binary map represents neighboring cameras of the camera; and
    b. a processor coupled to the memory, the processor configured for processing the application.

18. The apparatus of claim 17 wherein the application is further for assuming the plurality of cameras are positioned toward an object so positions of the plurality of cameras form a circle or a convex arc.

19. The apparatus of claim 17 wherein a position of the initial camera pair is known.

20. The apparatus of claim 17 wherein estimating the camera position of the camera not in the initial camera pair utilizes five local correspondences between each of three camera pairs.

21. The apparatus of claim 17 wherein estimating the camera position of the camera not in the initial camera pair is based on a 5-point essential matrix estimation.

22. The apparatus of claim 17 wherein estimating the camera position of the camera not in the initial camera pair is based on a matrix and an 8-point algorithm.

23. The apparatus of claim 17 wherein estimating the camera position of the camera not in the initial camera pair includes bundle adjust after each estimate of the camera position.

24. The apparatus of claim 17 wherein obtaining camera ordering comprises:
    (1) performing background extraction;
    (2) performing pairwise camera correspondence extraction;
    (3) identifying neighboring cameras;
    (4) determining neighboring camera positioning; and
    (5) performing camera list topology deduction.

* * * * *